US012113606B2

(12) United States Patent
Shi et al.

(10) Patent No.: US 12,113,606 B2
(45) Date of Patent: Oct. 8, 2024

(54) METHODS AND SYSTEMS FOR MOBILITY MANAGEMENT IN NON-TERRESTRIAL NETWORKS

(71) Applicant: ZTE CORPORATION, Guangdong (CN)

(72) Inventors: Xiaojuan Shi, Guangdong (CN); Jianwu Dou, Guangdong (CN); Nan Zhang, Guangdong (CN); Wei Cao, Guangdong (CN); He Huang, Guangdong (CN); Li Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 56 days.

(21) Appl. No.: 17/212,594

(22) Filed: Mar. 25, 2021

(65) Prior Publication Data
US 2021/0314060 A1 Oct. 7, 2021

Related U.S. Application Data

(63) Continuation of application No. PCT/CN2018/107971, filed on Sep. 27, 2018.

(51) Int. Cl.
*H04B 7/185* (2006.01)
*H04W 8/08* (2009.01)

(52) U.S. Cl.
CPC ..... *H04B 7/18541* (2013.01); *H04B 7/18547* (2013.01); *H04W 8/08* (2013.01)

(58) Field of Classification Search
CPC ............ H04B 7/18541; H04B 7/18547; H04B 7/18504; H04W 8/08; H04W 72/00;
(Continued)

(56) References Cited

U.S. PATENT DOCUMENTS 6,408,180 B1 6/2002 McKenna et al.
7,054,641 B1 5/2006 Oxley et al.
(Continued)

FOREIGN PATENT DOCUMENTS

CN 101808380 A 8/2010
CN 102255648 A 11/2011
(Continued)

OTHER PUBLICATIONS

Thales, "NTN RAN architecture key issues" 3GPP TSG RAN WG3Meeting #101, R3-184525, Gothenburg, Sweden, Aug. 10, 2018, 6 pages.
(Continued)

*Primary Examiner* — Nishant Divecha
(74) *Attorney, Agent, or Firm* — Duane Morris LLP

(57) ABSTRACT

Methods and systems for mobility management in non-terrestrial networks are disclosed. In one embodiment, a method performed by a first communication node, includes: during a first time period, communicating with a non-terrestrial communication node utilizing a first communication link, wherein the non-terrestrial communication node provides at least one geographic cell in which a user equipment device (UE) is present during the first time period; during a second time period, communicating with a second communication node utilizing a second communication link, wherein a third communication link is established between the non-terrestrial communication node and the second communication node and the first communication link is no longer utilized during the second time period; and determining to maintain the first communication node as an anchor node for communications between a core network and the UE during both the first and second time periods.

17 Claims, 14 Drawing Sheets

(58) Field of Classification Search
 CPC ............. H04W 72/04; H04W 72/1205; H04W 72/1263; H04W 74/02; H04W 84/005
 See application file for complete search history.

(56) References Cited

U.S. PATENT DOCUMENTS

| | | | |
|---|---|---|---|
| 11,405,797 B2* | 8/2022 | Vaidya | .................. H04W 24/02 |
| 2009/0147750 A1 | 6/2009 | Schindler et al. | |
| 2010/0128656 A1 | 5/2010 | Kim et al. | |
| 2010/0265879 A1 | 10/2010 | Foxworthy et al. | |
| 2014/0010207 A1* | 1/2014 | Horn | ...................... H04W 24/10 |
| | | | 370/332 |
| 2016/0183139 A1 | 6/2016 | Meredith et al. | |
| 2017/0041830 A1 | 2/2017 | Davis et al. | |
| 2017/0272131 A1 | 9/2017 | Ananth et al. | |
| 2018/0234839 A1 | 8/2018 | Tenny | |
| 2019/0380128 A1* | 12/2019 | Park | .................. H04W 72/0433 |
| 2021/0176802 A1* | 6/2021 | Sirotkin | ................ H04W 76/22 |

FOREIGN PATENT DOCUMENTS

| | | |
|---|---|---|
| CN | 103220740 A | 7/2013 |
| CN | 106537823 A | 3/2017 |
| CN | 107852230 A | 3/2018 |

OTHER PUBLICATIONS

Zte, "Further Discussion on NTN Architecture Issues" 3GPP TSG RAN WG3 #101, R3-184515, Gothenburg, Sweden, Aug. 10, 2018, 4 pages.

Huawei, "Discussion on Non Terrestrial Network" 3GPP TSG-RAN3 Meeting #101, R3-184939, Gothenburg, Sweden, Aug. 10, 2018, 9 pages.

* cited by examiner

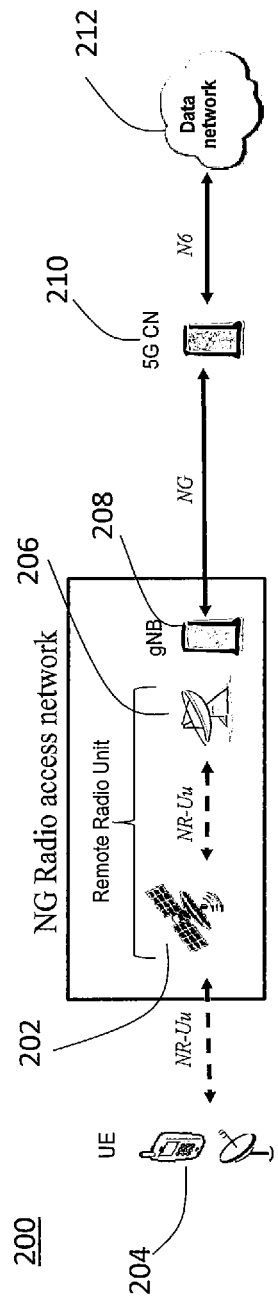
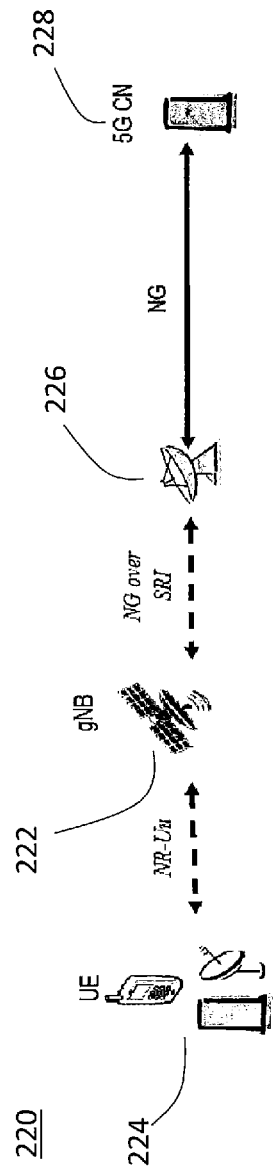
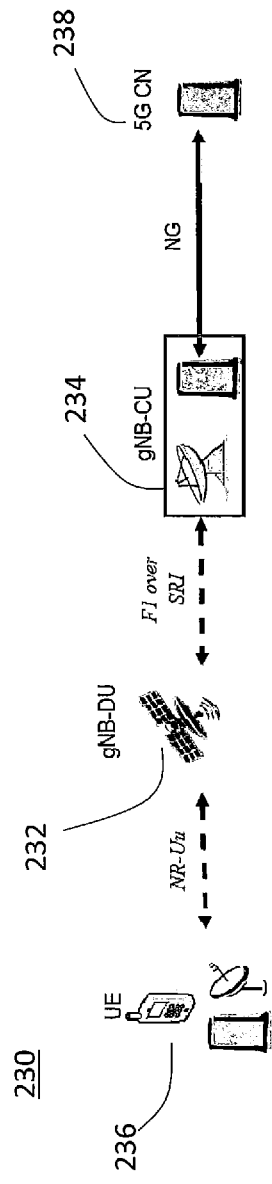
Figure 2A
Figure 2B
Figure 2C

METHODS AND SYSTEMS FOR MOBILITY MANAGEMENT IN NON-TERRESTRIAL NETWORKS

TECHNICAL FIELD

The disclosure relates generally to wireless communications and, more particularly, to methods and systems for performing mobility management in non-terrestrial networks.

BACKGROUND

With the development of the new radio (NR) access technologies (i.e., 5G), a broad range of use cases including enhanced mobile broadband, massive machine-type communications (MTC), critical MTC, etc., can be realized. To expand the utilization of NR access technologies, 5G connectivity via satellites is being considered as a promising application. In contrast to the terrestrial networks where all communication nodes (e.g., base stations) are located on the earth, a network incorporating satellites and/or airborne vehicles to perform some or all of the functions of terrestrial base stations is referred to as a non-terrestrial network.

Spaceborne vehicles include satellites such as Low Earth Orbiting (LEO) satellites, Medium Earth Orbiting (MEO) satellites, Geostationary Earth Orbiting (GEO) satellites, as well as Highly Elliptical Orbiting (HEO) satellites, collectively referred to as "satellites" herein. Airborne vehicles include Unmanned Aircraft Systems (UAS) including tethered UAS and Lighter than Air UAS (LTA), Heavier than Air UAS (HTA), and High Altitude Platforms UAS (HAPs), collectively referred to herein as "UAS platforms."

In some geographic areas, terrestrial networks are not deployed due to economic reasons (e.g., expectation for revenues does not meet a minimum threshold for profitability). Additionally, natural disasters (e.g. earthquakes, floods, etc.) can result in a temporary outage or total destruction of terrestrial network infrastructures, which then need to be repaired or replaced. With the deployment of non-terrestrial networks, service ubiquity and continuity can be achieved even in these "unserved" or "underserved" areas. Furthermore, due to the reduced vulnerability of spaceborne or airborne vehicles to physical attacks and natural disasters, the development of non-terrestrial networks is especially of interest to public safety or railway communication systems.

In non-terrestrial networks, a satellite may be in a Geostationary Earth orbit (GEO), referred to herein as a "GEO satellite," or a Non-GEO orbit (i.e., Low Earth Orbit and Medium Earth Orbit), referred to herein as "Non-GEO satellites." A GEO satellite remains relatively fixed in location with respect to earth such that it appears to remain at a fixed position in the sky to observers on the ground. However, the Non-GEO satellite moves over the earth, such that it changes its position in the sky over time to observers on the ground. Since the Non-GEO satellite keeps moving/flying over the earth, it must eventually change its wireless connection to an earth station communicating with the satellite. Additionally, the movement of the Non-GEO satellite would cause user equipment devices (UEs), such as mobile terminals (MTs), served by the satellite to change their connections from one satellite to another from time to time. For instance, a Non-GEO satellite can fly over a particular area that is approximately 200 kilometers (km) in diameter in just 10 minutes. Thus, MTs in this particular area must be handed over from one satellite to a succeeding satellite that flies over the same area every 10 minutes.

In conventional terrestrial networks, the mechanism and techniques for mobility management are configured to accommodate and manage the mobility of moving MTs. However, in non-terrestrial networks with high-speed satellites, resulting in rapidly moving geographic cells, applying existing mobility management technique to the non-terrestrial networks would result in a number of challenges such as, for example, frequently changing security keys, frequently moving UE contexts, etc., which would require large amounts of processing and resources and may cause unexpected data interruption. Thus, existing systems and methods for mobility management are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first communication node, includes: during a first time period, communicating with a non-terrestrial communication node utilizing a first communication link, wherein the non-terrestrial communication node provides at least one geographic cell in which a user equipment device (UE) is present during the first time period; during a second time period, communicating with a second communication node utilizing a second communication link, wherein a third communication link is established between the non-terrestrial communication node and the second communication node and the first communication link is no longer utilized during the second time period, and the UE remains within the at least one geographic cell during the second time period; and determining to maintain the first communication node as an anchor node for communications between a core network and the UE during both the first and second time periods.

In another embodiment, a method performed by a first communication node, includes: during a first time period, communicating with a first non-terrestrial communication node utilizing a first communication link, wherein the first non-terrestrial communication node provides a first geographic cell in which a user equipment device (UE) is present during the first time period; during a second time period, communicating with a second communication node utilizing a second communication link, wherein the second communication node is configured to communicate with a second non-terrestrial communication node utilizing a third communication link, and the UE has moved within a second geographic cell provided by a second non-terrestrial communication node; and determining to maintain the first communication node as an anchor node for communications between a core network and the UE during both the first and second time periods.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIGS. 2A-2C illustrate various scenarios of non-terrestrial networks in which techniques disclosed herein may be implemented, in accordance with some embodiments of the present disclosure.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical terrestrial communication network includes one or more base stations (typically known as a "BS") that are located on earth (i.e., not airborne or spaceborne) that each provides geographical radio coverage, and one or more wireless user equipment devices (typically known as a "UE") that can transmit and receive data within the radio coverage. In the terrestrial communication network, a BS and a UE can communicate with each other via a communication link, e.g., via a downlink radio frame from the BS to the UE or via an uplink radio frame from the UE to the BS. The present disclosure provides systems and methods for replacing one or more terrestrial BSs with one or more satellites to provide a non-terrestrial network, in accordance with various embodiments.

Figure 1:
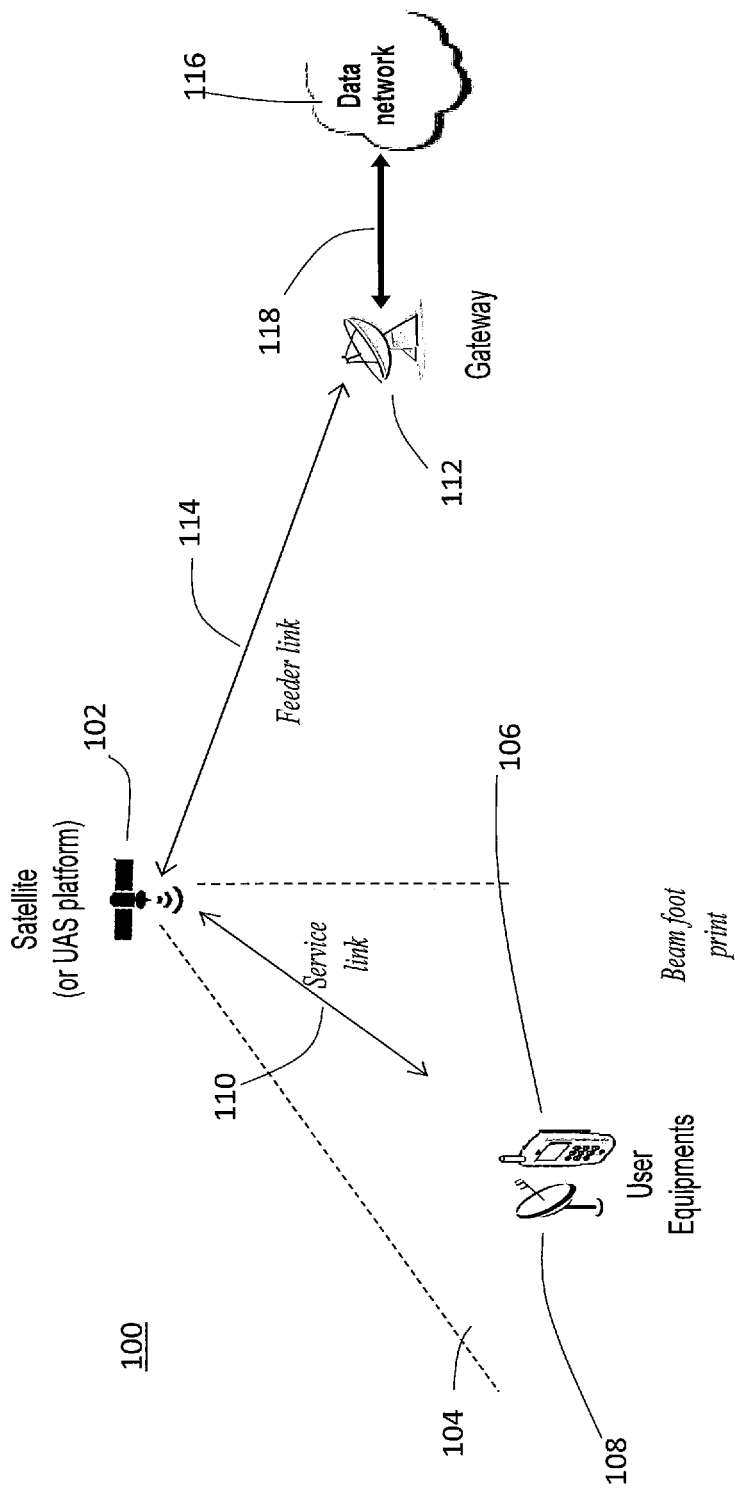
FIG. 1 illustrates an exemplary non-terrestrial network and its geographic cells in which techniques disclosed herein may be implemented, in accordance with some embodiments of the present disclosure.

FIG. 1 illustrates an exemplary scenario of a non-terrestrial (NT) network 100 in which the techniques, processes and methods described herein can be implemented, in accordance with various embodiments. As shown in FIG. 1, the NT network 100 includes at least one satellite 102, or alternatively a UAS platform 102, that provides a plurality geographic cells 104 for serving user equipment devices (UEs) 106 and 108 located in one or more of the geographic cells 104. In FIG. 1, example UEs are a normal mobile terminal (MT) 106 and a very small aperture terminal (VSAT) 108, which can wirelessly communicate with the satellite/UAS platform 102 via a communications link 110, such as service link or radio link in accordance with a new radio (NR) access technology (e.g., a NR-Uu interface).

Satellites and UAS platforms are collectively referred to as "non-terrestrial communication nodes" or "NT communication nodes" herein. In the following description of exemplary embodiments, a satellite is described as the NT communication node. It is understood, however, that alternative embodiments can utilize a UAS platform as the NT communication node while remaining within the scope of the invention.

Referring still to FIG. 1, the satellite 102 also communicates with a gateway or earth station 112 via a communication link 114, which may be a feeder link or radio link in accordance with NR access technologies. The gateway or earth station 112 (e.g., a head station) is communicatively coupled to a data network 116 via a communication link 118, which may be a physical link such as a fiber optic cable, for example. In some embodiments, a core network (e.g., 5G CN) is interposed between the gateway 112 and the data network 116. In accordance with various embodiments, the satellite 102 may be implemented with either a transparent or a regenerative payload. When the satellite carries a "transparent" payload (referred to herein as "transparent satellite"), it performs only radio frequency filtering, frequency conversion and/or amplification of signals on board. Hence, the waveform signal repeated by the payload is unchanged. When a satellite carries a regenerative payload (referred to herein as a "regenerative satellite"), in addition to performing radio frequency filtering, frequency conversion and amplification, it performs other signal processing functions such as demodulation/decoding, switching and/or routing, coding/decoding and modulation/demodulation on board as well. In other words, for a satellite with a regenerative payload (re, all or part of base station functions (e.g., a gNB, eNB, etc.) are implemented on board.

FIG. 2A illustrates a scenario in which a non-terrestrial network 200 is implemented with a transparent satellite 202, in accordance with one embodiment of the invention. In this case, the transparent satellite 202 merely acts as a radio frequency (RF) repeater with frequency conversion. The transparent satellite 202 can communicate with one or more UEs 204 via a communications link such as a NR-Uu radio link. In the uplink direction, the satellite 202 communicates with a receiver 206 via a radio link such as a NR-Uu radio link. The receiver 206 in turn forwards data signals to/from a terrestrial base station 208 (e.g., a gNB 208) via conventional communication links and protocols. In this scenario, since the transparent satellite 202 is merely an RF repeater, all base station functions are performed by the terrestrial base station 208 on the earth. The base station 208 communicates with a core network 210 via a next generation (NG) communications link, which in turn communicates with a data network 212 via an N6 communications link in accordance with the NR N6 interface protocol.

FIG. 2B illustrates a scenario in which a non-terrestrial network 220 is implemented with a regenerative satellite 222 (i.e., all functions of a base station are implemented on board), in accordance with one embodiment of the invention. In accordance with various embodiments, the satellite 222 hosts one or more complete gNBs, which terminate the NG interface(s) from the 5G core network 228 (5G CN). As shown in FIG. 2B, the satellite 222 is communicatively coupled to a gateway or satellite head station 226 via an NG over satellite radio interface (SRI) communication link, which is in turn coupled to the 5G CN 228 via a NG communication link, in accordance with some embodiments. The gateway or satellite head station 226 encapsulates NG packets for transport over the SRI.

FIG. 2C illustrates a scenario in which a non-terrestrial network 230 is implemented with a split architecture, wherein the satellite 232 is a regenerative satellite that performs the functions of a distributed unit (DU) base station (gNB-DU) in a split architecture network. In this case, the functions of a base station are split into a distributed unit base station (gNB-DU) and a central unit base station 234 (gNB-CU). In accordance with various embodiments, the satellite 232 hosts one or more gNB-DUs; the gNB-CU 234 is on the ground. In some embodiments, an F1 interface between gNB-CU 234 and gNB-DU 232 is transported over a Satellite Radio Interface (SRI). As shown in FIG. 2C, the satellite 232 serves one or more UEs 236 located in one or cells provided by the satellite 232. The gNB-CU 234 is communicatively coupled to a core network 238 via a NG interface protocol, in accordance with some embodiments.

Figure 3:
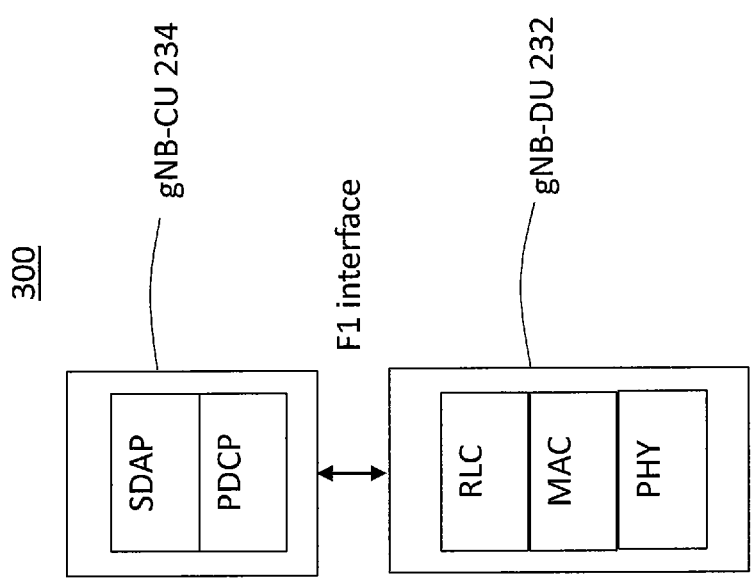
FIG. 3 illustrates a user plane protocol split architecture for new radio (NR) wherein user plane functions are split between a base station central unit (e.g., gNB-CU) and a base station distributed unit (e.g., gNB-DU), which may be incorporated with various techniques disclosed herein, in accordance with various embodiments.

FIG. 3 illustrates a user plane (UP) protocol architecture 300 defined in NR for a gNB CU-DU split architecture network. In the illustrated architecture, the SDAP (Service Data Adaptation Protocol) layer and PDCP (Packet Data Convergence Protocol) layer functions are performed by the gNB-CU 234 of FIG. 2C. While the RLC (Radio Link Control), MAC (Medium Access Control) and PHY (Physical) layers functions are performed by the gNB-DU satellite 232 of FIG. 2C. The gNB-CU 234 and gNB-DU 2332 are connected via the F1 interface.

Figure 4:
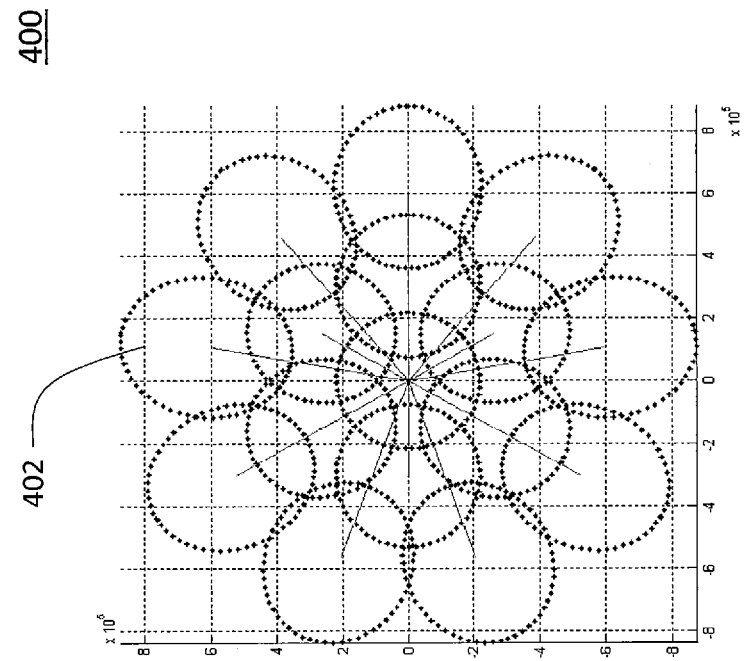
FIG. 4 illustrates an exemplary field of view of a satellite and corresponding geographic cells in which techniques disclosed herein may be implemented, in accordance with some embodiments of the present disclosure.

Typically, a satellite generates several beams over a given service area bounded by its field of view. The footprints of the beams are typically of elliptic shape each of which can be considered to be a geographic cell of the satellite. FIG. 4 illustrates an example field view 400 of a satellite and a plurality of geographic cells 402 formed by the beams (not shown). Different beams generated by a single satellite can operate with different frequencies and PCIs. In other words, from the perspective of the UE, each single elliptic beam shape radiated from the satellite can be regarded as an individual physical cell. That is, beams radiated from a single satellite can generates lots of physical cells. However, in the remaining figures of this disclosure, only a single beam or single cell from one satellite is illustrated in order to simplify the illustration for purposes of discussion.

Figure 5:
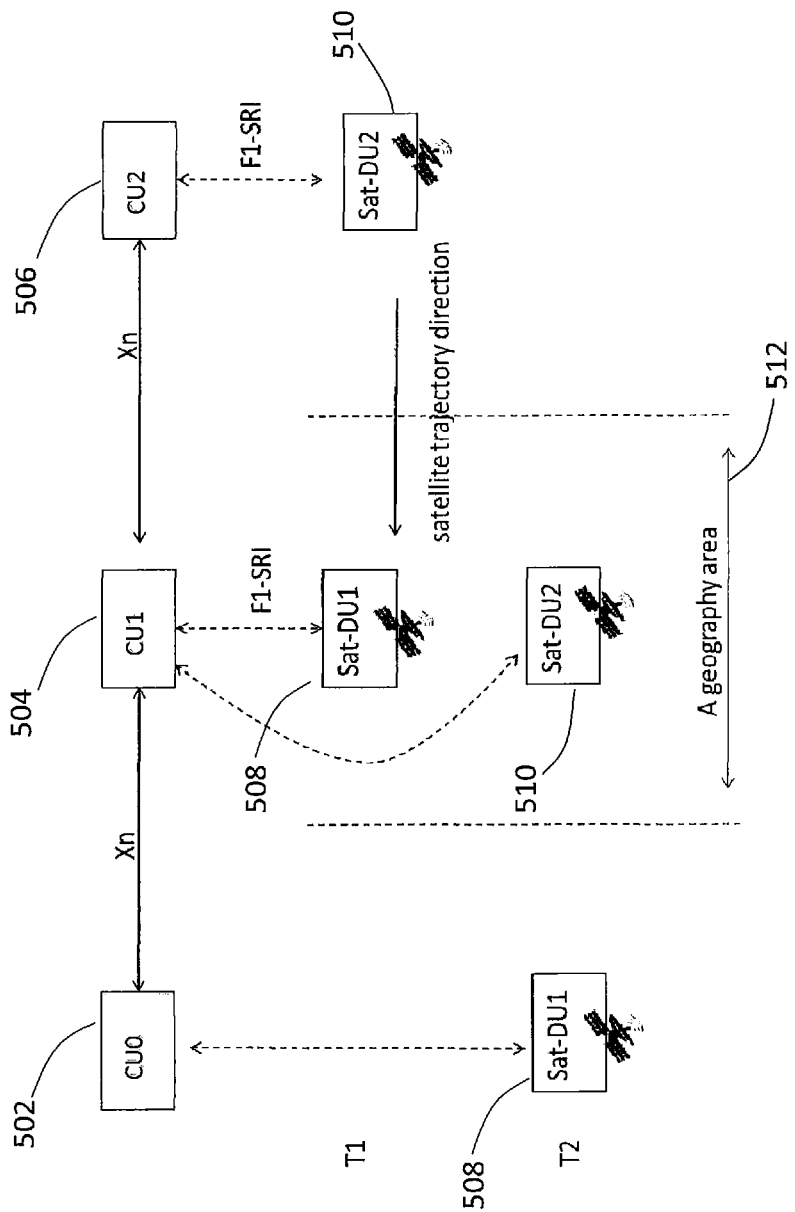
FIG. 5 illustrates an exemplary scenario of a non-terrestrial network implementing a split architecture and regenerative satellites, in accordance with some embodiments of the present disclosure.

As discussed above, non-GEO satellites are constantly flying over and moving with respect to the earth in a pre-determined orbit. Because of this constant motion of non-GEO satellites, unique mobility management issues will arise. For example, due to the motion of the satellite, its wireless connection will frequently change from one earth station to another in a predictable manner. FIG. 5 illustrates a possible scenario in which a non-terrestrial network 500 is implemented as split architecture network having central unit (CU) satellite stations 502 (CU0), 504 (CU1) and 506 (CU2), and distributed unit satellites Sat-DU1 508 and Sat-DU2 510. In some embodiments the central unit satellite stations 502, 504 and 506 are satellite head stations or base stations (referred to as "CU stations" herein), which can each connect to multiple satellites, and configured to perform SDAP and PDCP layer functions. The distributed unit satellites 508 and 510 are configured to perform RLC, MAC and PHY layer functions, as discussed above with respect to FIG. 3. In some embodiments, the CU stations 502, 504 and 506 are fixed on the earth and the DU satellites 508 and 510 are flying over the earth in a predictable path.

Due to their relative motion with respect to one another, wireless connections between CU stations and the DU satellites will change over time. As shown in FIG. 5, at time T1, the first DU satellite 508 (shown as "Sat-DU1") is within the field of view of geographic area 512 served by the first CU station 504 504 and, therefore, connects to the first CU station 504 (CU1) and the second DU satellite 510 (Sat-DU2) connects to the second CU station 506 (CU2). At time T2, the first DU satellite 508 is no longer over geographic area 512 served by the first CU station, and changes its connection to a third CU station 502 (CU0), e.g. via a wireless TNL(Transport Network layer) re-association. The TNL re-association can be realized, e.g., by deleting the F1 interface between Sat-DU1 508 and CU1 504 and setting up of a new F1 interface between Sat-DU1 508 and CU0 502. At time T2, the Sat-DU2 510 has moved over geographic area 512 and, therefore, changes its connection from CU2 506 to CU1 504, e.g., via a wireless TNL re-association.

Figure 6:
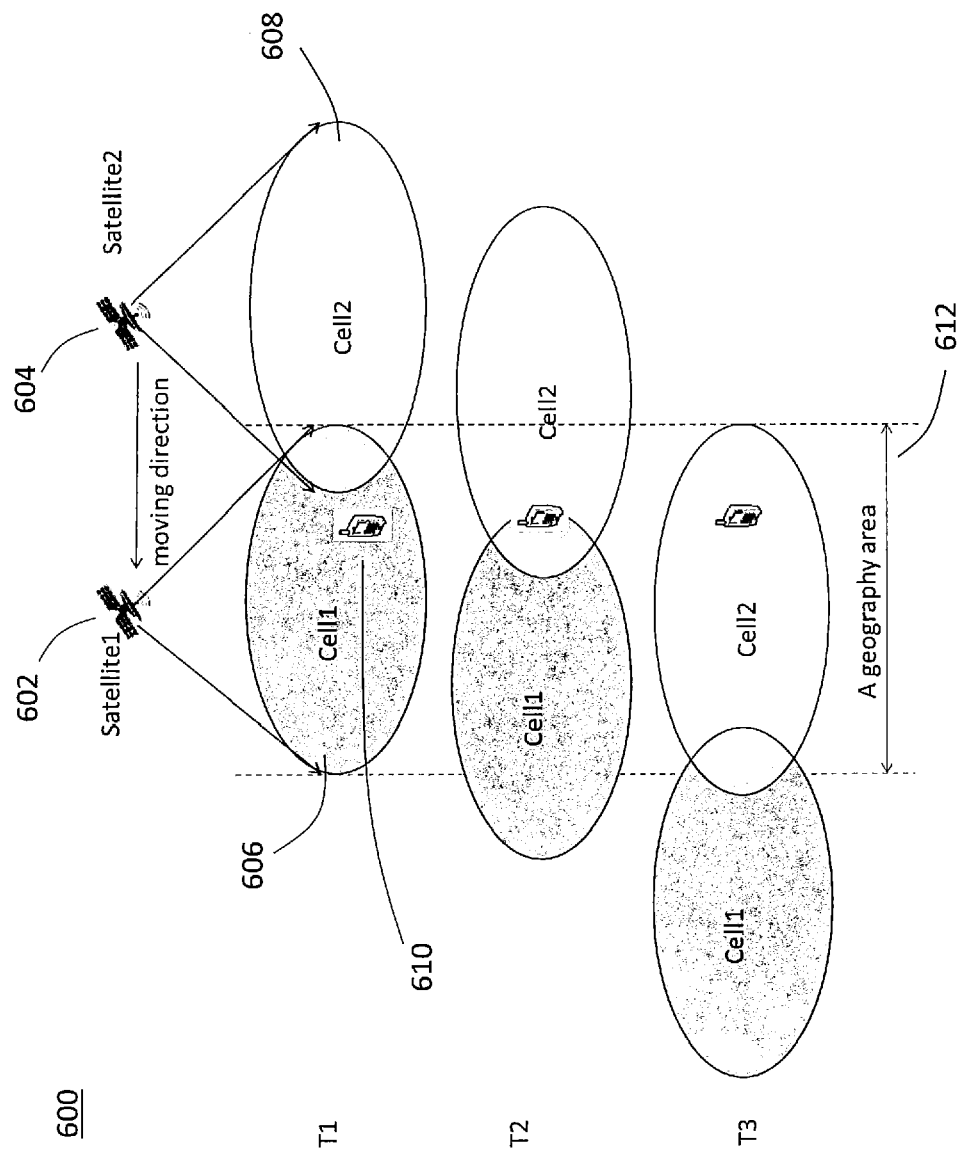
FIG. 6 illustrates an exemplary scenario in which a user equipment device changes geographic cells provided by satellites due to motion of the satellites, and in which techniques disclosed herein may be implemented, in accordance with some embodiments of the present disclosure.

With the constant motion of DU satellites, the UEs connected to or camped in the cells generated by the satellites would be impacted. FIG. 6 illustrates a possible scenario 600 in which the movement of satellites 602 and 604, each of which provides geographic cell coverage on the ground, causes the handover of a relatively stationary UE from one satellite to another. As shown in FIG. 6, the motion of the satellites 602 and 604 causes their respective geographic cells 606 and 608, defined by the field of view their respective satellites 602 and 604, to move over time. At time T1, a UE 610 camped in geographic area 612 is contained completely in Cell1 606 of Satellite 602. However, at time T2, the coverage of Cell1 606 has moved significantly to the left such that the UE 610 is now at an edge of Cell1 606 and now contained in the coverage area of Cell2 608, which has also moved in similar fashion to Cell1 606. Then at time T3, the UE 610 is only in Cell2 608 radiated from Satellite2 604. Thus, at time T3, a handoff from Cell1 606 to Cell2 608 is necessary, and may even be desirable at time T2 when the UE 610 is within both cell's geographic areas.

As illustrated in FIG. 6, a UE 610 that is relatively stationary compared to the satellites 602 and 605 may require frequent handoffs from one satellite/cell to another satellite/cell. Under traditional mobility management techniques, such handoffs would require a change in the PDCP anchor, transfer of UE content information, etc., for each handoff, which would require significant processing overhead and resources to manage the frequent handoffs. Thus, a new mobility management technique is necessary.

Various methods for performing mobility management in non-terrestrial networks are disclosed herein. In accordance with various embodiments, methods for mobility management can be performed in non-terrestrial (NT) networks employing a split architecture (i.e., splitting base station functions into gNB-DU gNB-CU communication node), or performed in NT networks employing a transparent satellite in communications with a terrestrial base station (e.g., a gNB on the earth). Various exemplary scenarios are described in further detail below.

Figure 7:
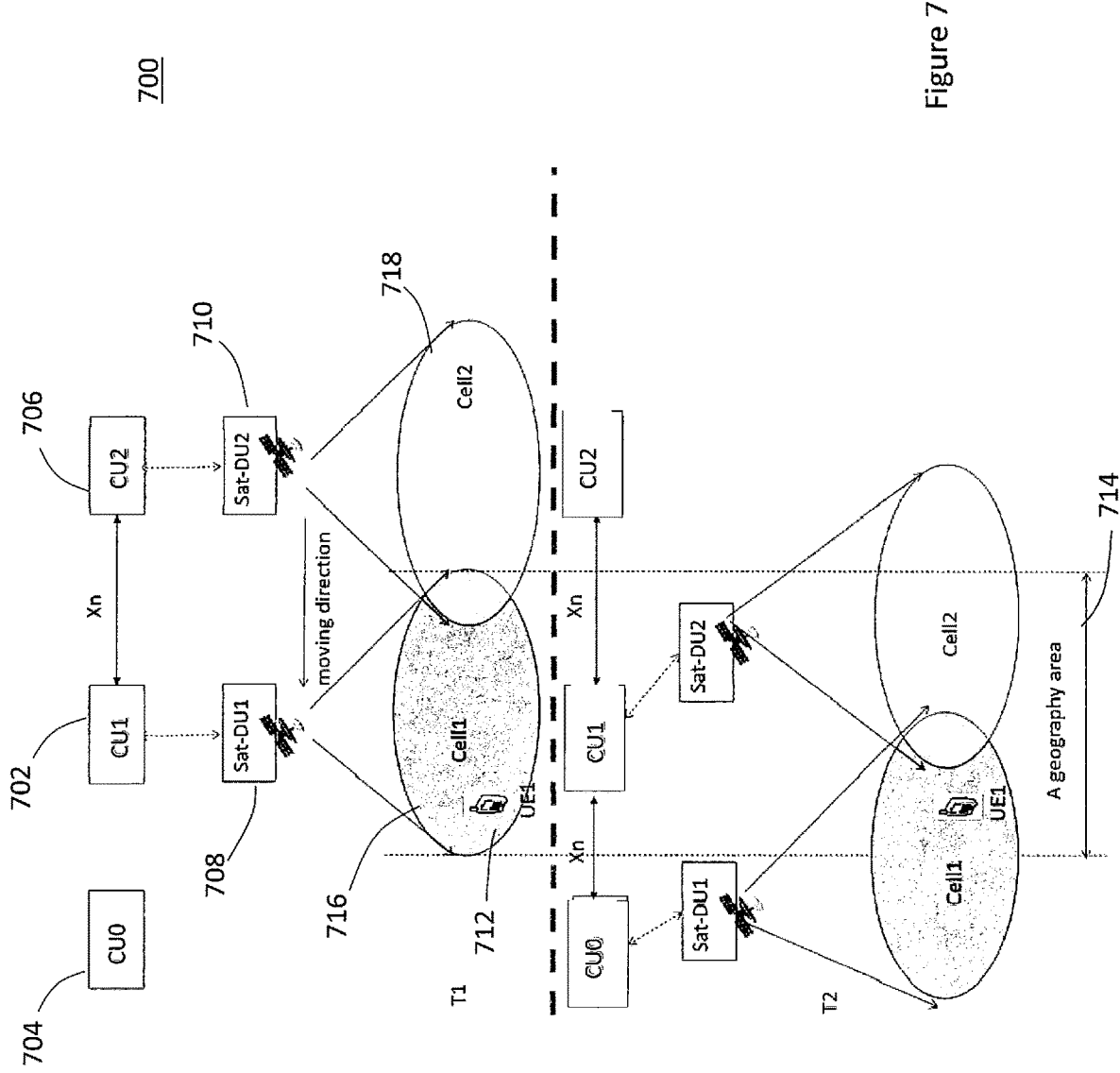
FIG. 7 illustrates an exemplary scenario in which a user equipment device remains in the same geographic cell but split architecture regenerative satellites of the non-terrestrial network have moved, and in which techniques disclosed herein may be implemented, in accordance with some embodiments of the present disclosure.

FIG. 7 illustrates an example scenario in which mobility management is performed in a NT network 700 employing a split architecture, in accordance with some embodiments. The NT network 700 includes a first central unit (CU) station 702 (CU1) which serves satellite DU(s) and configured to perform a first portion of base station functions. In some embodiments, the first portion of base station functions comprises SDAP and PDCP layer processes. The NT network 700 further includes a second CU station 704 (CU0) and a third CU station 706 (CU2) each configured to perform the first portion of base station functions in a similar manner as the first CU station 702. In accordance with some embodiments, the CU stations 702, 704 and 706 include hardware, firmware and/or software for performing the first portion of base station functions. In other words, each of the CU stations 702, 704 and 706 include a base station (e.g., a gNB), or at least portions thereof, for performing at least the first portion of base station functions.

The NT network 700 further includes a first distributed unit (DU) satellite 708 (Sat-DU1) and a second DU satellite 710 (Sat-DU2) each configured to perform a second portion of base station functions, in accordance with some embodiments. In some embodiments, the second portion of base station functions includes RLC layer, MAC layer and PHY layer processes. In accordance with some embodiments, the DU satellites 708 and 710 carry a regenerative payload, which includes hardware, firmware and/or software for performing the second portion of base station functions. In other words, each of the EU satellites 708 and 710 include a base station (e.g., a gNB), or at least portions thereof, for performing at least the second portion of base station functions.

In the example of FIG. 7, the first and second DU satellites 708 and 710 (Sat-DU1 and Sat-DU2) are flying from the right to the left. During a first time period starting at time T1, the first DU satellite 708 (Sat-DU1) and the second DU satellite 710 (Sat-DU2) are connected to the first CU station 702 (CU1) and the third CU station 706 (CU2), respectively, via corresponding communication links. In some embodiments, the communication links between CU stations and DU satellites includes an F1 interface over satellite radio interface (SRI). During this first time period, a UE 712 which is located in geographic area 714 is camped in and served by a first geographic cell 716 (Cell1) formed by one or beams from the first DU satellite 708 (Sat-DU1). A second geographic cell 718 (Cell2) radiated by the second DU satellite 710 is only partially in the geographic area 714 and the second DU satellite 710 (Sat-DU2) is connected (i.e., communicatively coupled) to the third CU station 706 (CU2) during the first time period (i.e., the period starting at time T1 and ending at time T2).

As the DU satellites 708 and 710 continue travelling left, at time T2, the first DU satellite 708 (Sat-DU1) and the second DU satellite 710 (Sat-DU2) change their connections to the second CU station 704 (CU0) and first CU station 702 (CU1), respectively. The original F1 interface between the first DU satellite 708 (Sat-DU1) and the first CU station 702 is released and a new F1 interface between the first DU satellite 708 (Sat-DU1) and the second CU station 704 (CU0) is established. Similarly, original F1 interface between the second DU satellite 710 (Sat-DU2) and the third CU station 706 (CU2) is released and a new F1 interface between the second DU satellite 710 (Sat-DU2) and the first CU station 702 (CU1) is established. As shown in FIG. 7, at time T2, the geographic area 714 is partially covered by the first cell 716 (Cell1) radiated from the first DU satellite 708 (Sat-DU1) and partially covered by the second cell 718 (Cell2) radiated from the second DU satellite 710 (Sat-DU2). In this scenario, during a second time period starting at time T2, the UE 712 remains within the first cell 716 and thus remains communicatively coupled to the first DU satellite 708 (Sat-DU1), assuming the signal quality of the first cell 716 (Cell1) remains good enough.

In some embodiments, when the first DU satellite 708 (Sat-DU1) changes its connection from the first CU 702 station (CU1) to the second CU station 704 (CU0), either the first or second CU station 702 or 704 determines to maintain the PDCP anchor of the UE 712 at the first CU station 702 (CU1). Thus, neither the SDAP entity nor the PDCP entity need be set up for the UE 712 on the second CU station 704 (CU0), which saves processing overhead, time and network resources and also avoid the unnecessary security key change. As used herein, the terms "PDCP anchor" are "anchor node" are synonymous and refer to an entity that performs at least PDCP processing for UL and/or DL communications associated with a UE.

In some embodiments, the first or second CU station 702/704 determines to keep the PDCP anchor of the UE 712 (UE1) on the first CU 702 station according to at least one of the following criteria: (1) the location or position of the UE 712 and (2) the history information of the UE 712, which includes information about cells that UE has been served by or has visited in the past. In some embodiments, the location or position of UE1 can be determined by at least one of the following parameters: longitude and latitude, ellipsoid point, ellipsoid point with uncertainty circle, ellipsoid point with uncertainty ellipse, ellipsoid point with altitude, ellipsoid point with altitude and uncertainty ellipsoid, ellipsoid arc, polygon, horizontal velocity, GNSS (Global Navigation Satellite System) positioning information. In some embodiments, the UE periodically reports its location or position information to the CU stations 702 and/or 704 via global positions satellite (GPS) techniques known in the art.

Figure 8:
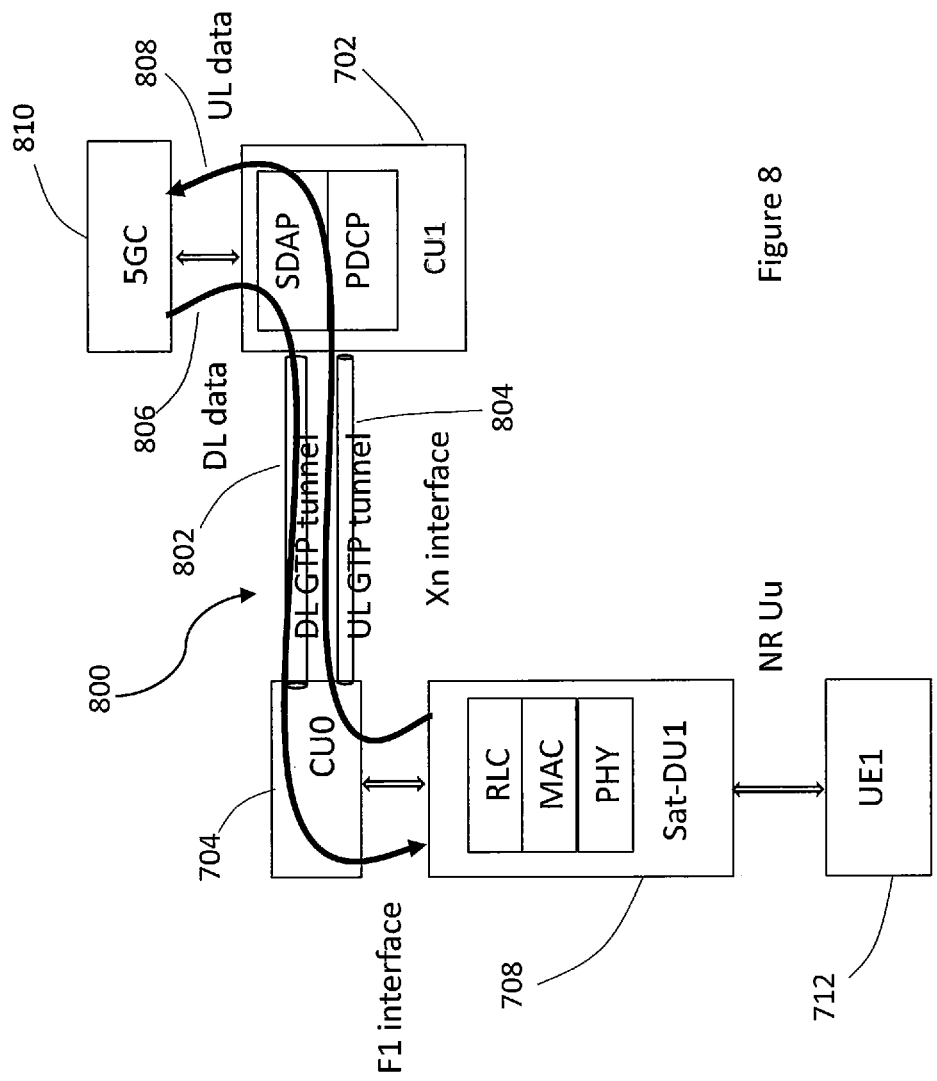
FIG. 8 illustrates exemplary communication channels formed as a result of the moving regenerative satellites of FIG. 7, in accordance with some embodiments of the present disclosure.

FIG. 8 illustrates how a communication link 800 is established between the first CU station 702 (CU1) and the second CU station 704 (CU0) of FIG. 7, during the second time period starting at time T2. In accordance with some embodiments, the communication link 800 includes at least downlink general packet radio service (GPRS) tunnel protocol for user plane data (DL GTP-U) 802 and at least one uplink (UL) GPRS tunnel protocol for user plane data (UL GTP-U) 804 for each radio bearer (RB) established for the UE 712 (UE1). As shown in FIG. 8, the DL GTP-U tunnel 802 provides logical address translation for downlink data flows 806 from a Fifth Generation core network 810 (5GC) to the first CU station 702 and then to the second CU station 704 via the DL GTP U tunnel 802. Similarly, the UL GTP-U tunnel 804 provides logical address translation for uplink data flows 808 from the second CU station 704 to the first CU station 702 and then to the core network 810.

During the second time period starting at time T2, the UE 712 (UE1) maintains its connection with the first DU satellite 708 and the 5G core network 810 maintains DL and UL data transmissions for the UE 712 with the first CU station 702, which is maintained as the PDCP anchor. When receiving DL data for the UE 712 from the core network 810 (5GC), after SDAP and PDCP processing by the first CU station 702, the DL data is transmitted from the first CU station 702 to the second CU station 704 via the established DL GTP-U tunnel(s) 802. With the reception of the DL data from the first CU station 702, the second CU station 704 forwards the DL data to the first DU satellite 708 (Sat-DU1) without further SDAP and PDCP processing. In some embodiments, the second CU station 704 performs only data relaying between the first CU station 702 and the first DU satellite 708.

When receiving UL data from the first DU satellite 708 for the UE 712, the second CU station 704 forwards the UL data to first CU station 702 via the established UL GTP-U tunnel(s) 804 without SDAP and PDCP processing. Thus, the second CU station 704 functions merely as a data relay for uplink communications to the first CU station 702 during the second time period. With the reception of UL data from second CU station 704, the first CU station 702 performs SDAP and PDCP processing the UL data and then delivers the UL data to the core network 810 (5GC). In some embodiments, for both UL and DL data, the first DU satellite 708 (Sat-DU1) performs RLC, MAC and PHY layer processing, as shown in FIG. 8.

As discussed above, even though the first DU satellite 708 is no longer connected to the first CU station 702 during the second time period, the PDCP anchor for communications with the UE 712, which is still connected to the first DU satellite 708, is maintained as the first CU station 702 instead of switching the PDCP anchor to the second CU station 704. This avoids significant signaling and management overhead that would otherwise be required by the core network 810 such as avoiding changing the PDCP anchor for communications with the UE 712 multiple times, avoiding changing security keys associated with the UE 712 multiple times, avoiding data interruptions as a result of such management processing, etc.

In some embodiments, besides DL data and UL data, user plane control packets for data resource bearers (DRBs) of the UE 712 are also transferred between the first CU station 702 and the first DU satellite 708 which are relayed via the second CU station 704 via the established UL GTP-U tunnel(s) 804. For instance, the first DU satellite 708 (e.g., a gNB-DU) may send a user plane control packet (e.g., DL DATA DELIVERY STATUS) to the first CU 702 (e.g., a gNB-CU) to allow the gNB-CU to perform downlink user data flow control. Similarly, when receiving a user plane control packet from the first CU station 702 for UE 712, the second CU station 704 forwards the packet to the first DU satellite 708 via the established DL GTP-U tunnel(s) 802.

After the second period, or when it is determined that the DL and UL GTP-U tunnels 802 and 804 are no longer necessary, either the first or second CU stations 702 or 704 can determine to delete the DL and UL GTP-U tunnels 802 and 804 established for UE 712 (UE1) between the first and second CU stations 702 or 704. For example, either the first or second CU stations 702 or 704 can determine to delete the DL and UL GTP-U tunnels 802 and 804 after the UE 712 completes a handover from the first DU satellite 708 (Sat-DU1) to the second DU satellite 710 (Sat-DU2) of FIG. 7.

Figure 9:
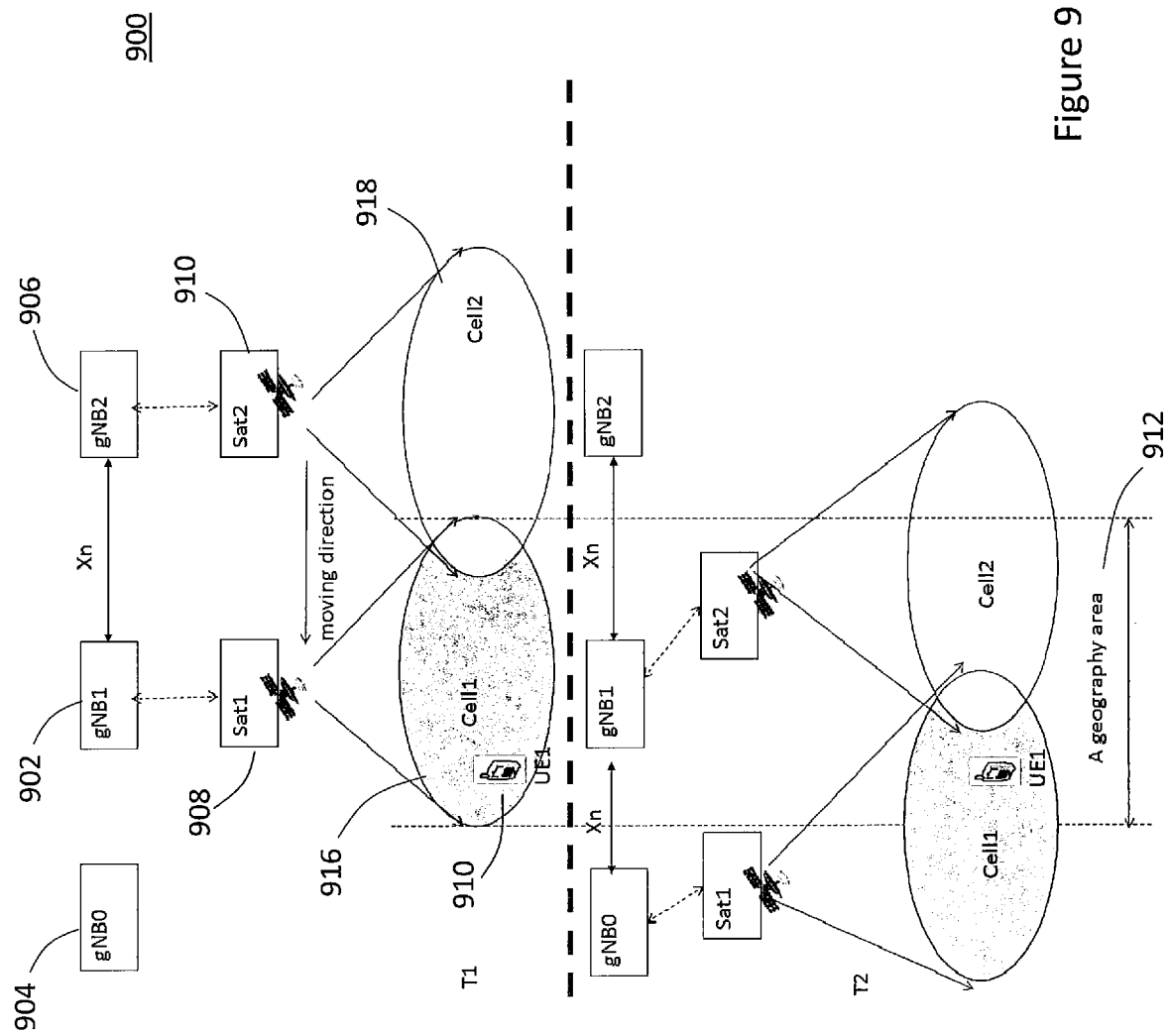
FIG. 9 illustrates an exemplary scenario in which a user equipment device remains in the same geographic cell but transparent satellites of the non-terrestrial network have moved, in which techniques disclosed herein may be implemented, in accordance with some embodiments of the present disclosure.

In alternative embodiments of the invention, the mobility solution discussed above for NT split architecture networks employing split architecture satellites (i.e., CU and DU satellites) can also be applied to NT networks employing transparent satellites that communicate with base stations (e.g., gNBs) located on earth. FIG. 9 illustrates an exemplary scenario in which a method of mobility management is performed in a NT network 900 employing terrestrial base stations and transparent satellites, in accordance with some embodiments. Compared to the NT network 700 of FIG. 7, in FIG. 9, the Sat-CUs are replaced with gNBs on the earth and the Sat-DUs are replaced with transparent satellites, however, the satellites travel in similar fashion as the DU satellites discussed above such that the same scenarios occur during the first and second time periods. In some embodiments, the link between a transparent satellite and a gNB on the earth is just a wireless feeder linker over the SRI.

As shown in FIG. 9, the NT network 900 includes a first terrestrial base station 902 (gNB1), a second terrestrial base station 904 (gNB0) and a third terrestrial base station 906 (gNB2). The NT network 900 further includes a first transparent satellite 908 (Sat1) and a second transparent satellite 910 (Sat2). A UE 912 is located in geographic area 914 and stays relatively stationary during a first time period before time T2 and a second time period starting at time T2. During the first time period, the geographic area 914 is primarily covered by a first cell 916 (Cell1) radiated by the first transparent satellite 916. At time T2, the first and second satellites 908 and 910 have moved substantially (to the left in FIG. 9) such that the connection of the first satellite 908 (Sat1) has changed from the first terrestrial base station 902 (gNB1) to the second terrestrial base station 904 (gNB0) and the second satellite 910 (Sat2) is now connected to the first base station 902 (gNB1). However, during the second time period beginning at time T2, the UE 912 remains within the first cell 916 (Cell1).

Similar to the NT split architecture network 700 discussed above with respect to FIG. 7, in the NT network 900 of FIG. 9, at time T2, when the first transparent satellite 708 (Sat1) changes its connection from the first terrestrial base station 902 (gNB1) to the second terrestrial base station 904 (gNB0), either the first or second base station 902 or 904 determines to maintain the PDCP anchor of the UE 912 at the first terrestrial base station 902 (gNB1). Thus, neither the SDAP entity nor the PDCP entity need be changed and set up for the UE 912 on the second terrestrial base station 904 (gNB0), which provides similar advantages to those discussed above.

Figure 10:
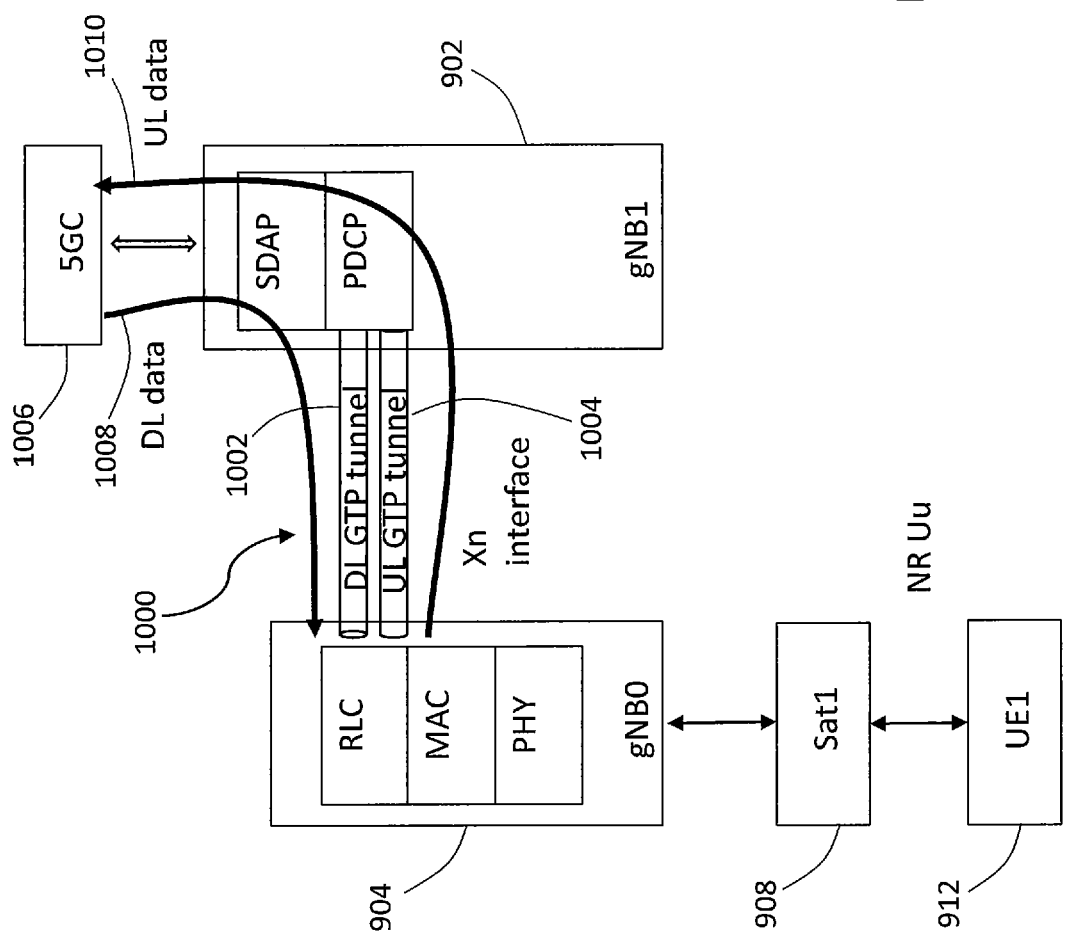
FIG. 10 illustrates exemplary communication channels formed as a result of the moving transparent satellites of FIG. 9, in accordance with some embodiments of the present disclosure.

As shown in FIG. 10, during the second time period beginning at time T2, a communication link 1000 is established between the first terrestrial base station 902 (gNB1) and the second terrestrial base station 904 (gNB0) in accordance with an Xn interface protocol. In some embodiments, the communication link 1000 includes at least one DL GTP-U tunnel 1002 and at least one UL GTP-U tunnel 1004 for each RB established for the UE 912 (UE1).

FIG. 10 further illustrates the protocol stack architecture and a data handling method for the scenario illustrated in FIG. 9, in accordance with some embodiments. During the second time period, the UE 912 (UE1) maintains its connection with the first satellite 908 (Sat1), which has switched its connection to the second base station 904 (gNB0), and the core network 1006 maintains DL and UL data transmissions for the UE 912 (UE1) with the first satellite 902 (gNB1), which is maintained as the PDCP anchor.

During the second time period, after establishing the communication link 1000, when the first terrestrial base station 902 receives DL data 1008 for the UE 912 (UE1) from the core network 1006, the first base station 902 performs SDAP and PDCP processing on the data and then transmits the DL data 1008 to the second terrestrial base station 904 (gNB0) via the established DL GTP-U tunnel(s) 1002. In some embodiments, the second terrestrial base station (gNB0) then transmits the DL data to the first transparent satellite 908 (Sat1) without SDAP and PDCP processing but performs RLC, MAC and PHY layer processing on the DL data before transmitting it to the first transparent satellite 908 (Sat1), as illustrated in FIG. 10. Thus, in the illustrated exemplary scenario, the first terrestrial base station 902 (gNB1) functions as a central unit (CU) base station (e.g., a gNB-CU) that performs a first portion of base station processing (e.g., SDAP and PDCP processing) and the second terrestrial base station 904 (gNB0) functions as a distributed unit (DU) base station (e.g., a gNB-DU) that performs a second portion of base station processing (e.g., RLC, MAC and PHY layer processing). After receiving the DL data from the second base station 904 (gNB0), the first transparent satellite 908 (Sat1) transmits the data to the UE 912 (UE1) without further data processing. In some embodiments, the link between a transparent satellite and a terrestrial base station is a feeder link on SRI, and the link between a transparent satellite and a UE is a NR Uu interface link.

When UL data 1010 is transmitted from the UE 912 to the transparent satellite 908, the transparent satellite forwards it to the second terrestrial base station 904. Upon receiving the UL data, the second base station 904 forwards the UL data to the first base station 902 via the established UL GTP-U tunnel 1002 without SDAP and PDCP processing but with RLC, MAC and PHY layer processing prior to transmitting, in accordance with some embodiments. Upon receiving UL data from the second base station 904, the first base station 902 performs SDAP and PDCP processing on the UL data and then delivers the data to the core network 1006. In this manner, the first terrestrial base station 902 is maintained as the PDCP anchor for the UE 912 during both the first and second time periods, even though the first transparent satellite 908 has switched its connection to the second base station 904 during the second time period. Thus, significant management overhead can be avoided, as discussed above.

Besides DL data and UL data transmissions, user plane control packets for DRBs of the UE 912 can also be transferred between the first and second terrestrial base stations 902 and 904, respectively, using the DL GTP-U and UP GTP-U tunnels 1002 and 1004, respectively, as discussed above. In alternative embodiments, one or more the terrestrial base stations 902, 904 and 906 may be replaced by one or more satellite head stations, which are configured to perform at least the same functions described above.

Figure 11:
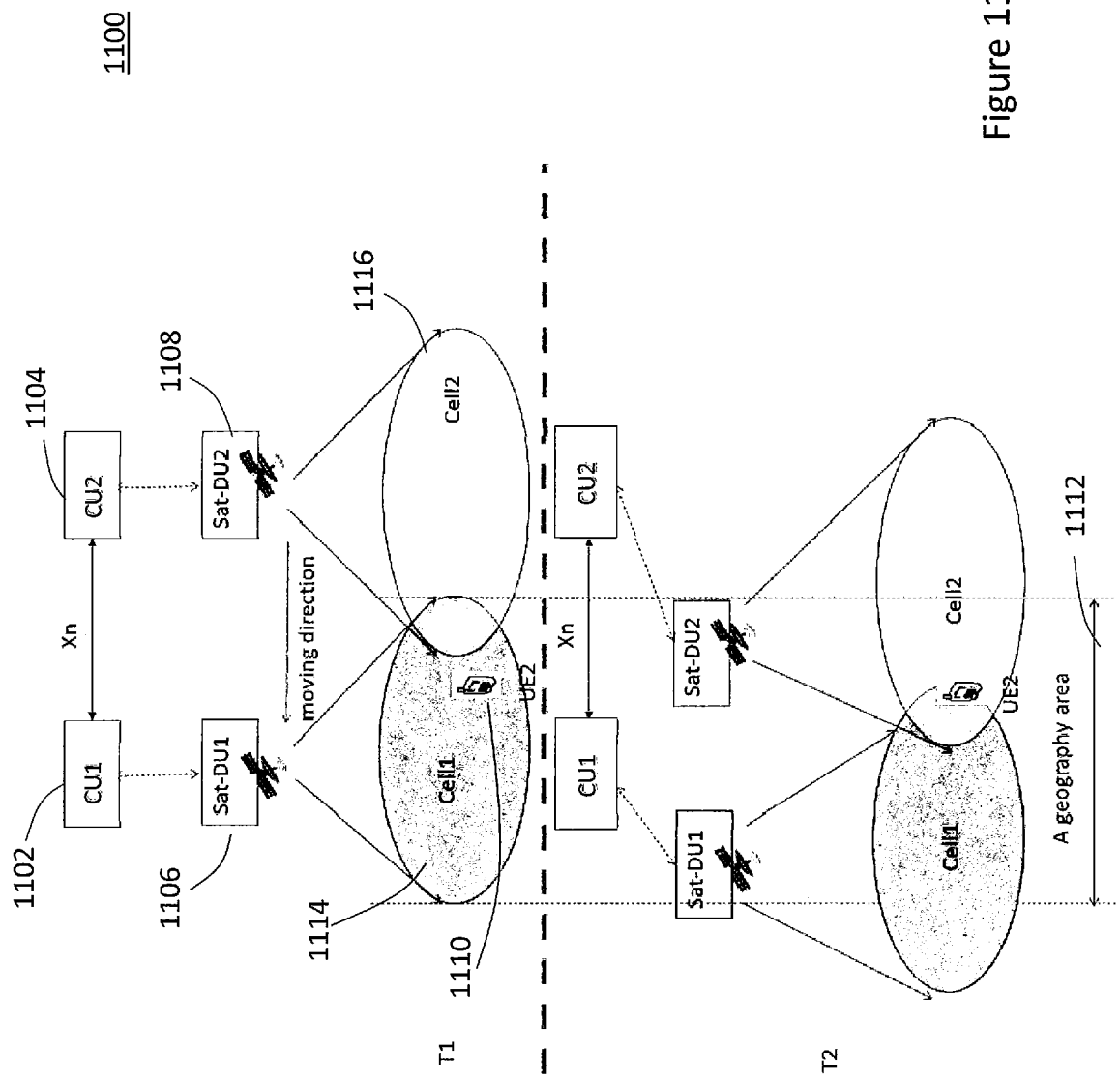
FIG. 11 illustrates an exemplary scenario in which a user equipment device changes geographic cells due to movement of split architecture regenerative satellites of a non-terrestrial network, in which techniques disclosed herein may be implemented, in accordance with some embodiments of the present disclosure.

FIG. 11 illustrates another scenario in which a mobility management method is performed in a NT network 1100, in accordance with further embodiments of the invention. The NT network 1100 includes a first CU station 1102 (CU1), a second CU station 1104 (CU2), a first DU satellite 1106 (Sat-DU1) and a second DU satellite 1108 (Sat-DU2). A UE 1110 (UE2) is located in geographic area 1112 is served by a first cell 1114 (Cell1) radiated by the first DU satellite 1106 during a first time period including time T1, as shown in FIG. 11. Although the UE 1110 remains relatively stationary in geographic area 1112, due to the motion of the DU satellites 1106 and 1108, during a second time period that includes time T2, the UE 1110 is within the geographic area covered by a second cell 1116 (Cell2) radiated by the second DU satellite 1108. In the exemplary scenario of FIG. 11, both the first and second DU satellites 1106 and 1108 are flying from the right to the left as indicated by the moving direction arrow. However, in contrast to the scenario of FIGS. 7 and 9, discussed above, the UE 1110 has switched from the first cell 1114 to the second cell 1116 and must undergo handover from the first cell 1114 to the second cell 1116.

Referring still to FIG. 11, at time T1, the first DU satellite 1106 and the second DU satellite 1108 are connected to the first CU station 1102 and the second CU station 1104, respectively, via respective communication links (e.g., a F1 interface over SRI). The geographic area 1112 is primarily covered by the first cell 1114 radiated by the first DU satellite 1106, and the UE 1110 is within the coverage of the first cell 1114. During this first time period, the first CU station 1102, via its connection to the first DU satellite 1106, serves as the anchor node for communications between the UE 1110 and a core network (not shown).

At time T2, despite their motion, the first and second DU satellites 1106 and 1108 maintain their connections to the first and second CU stations 1102 and 1104, respectively. However, the illustrated geographic area 112 is partially covered by the first cell 1114 and partially covered by the second cell 1116. As shown in FIG. 11, the UE 1110 is within the coverage areas of both the first and second cells 1114 and 1116 at time T2. In this situation, it is possible that the signal quality provided by the second cell 1116 radiated from the second DU satellite 1108 is better than the quality provided by the first cell 1114 radiated from the first DU satellite 1106 from the perspective of the UE 1110 at time T2. In this case, the UE will initiate a handover from the first cell 1114 to the second cell 1116.

In some embodiments, when the UE 1110 is handed over from the first cell 1114 to the second cell 1116, the first CU station 1102 may determine to keep the PDCP anchor of the UE 1110. Thus, it is not necessary to set up the SDAP entity or the PDCP entity for the UE 1110 on the second CU station 1104. In some embodiments, the first CU station 1102 determines to keep the PDCP anchor of the UE 1110 based on at least one of the following criteria: the location or position of the UE 1110; the history information of the UE 1110, which includes information about cells that UE 1110 has been served by or has visited in the past. In some embodiments, to assist the first CU station 1110 to decide whether to keep the PDCP anchor of the UE 1110, the location or position information of the UE 1110 can be reported by the UE 1110 to the first CU station 1102 in a measurement report.

Figure 12B:
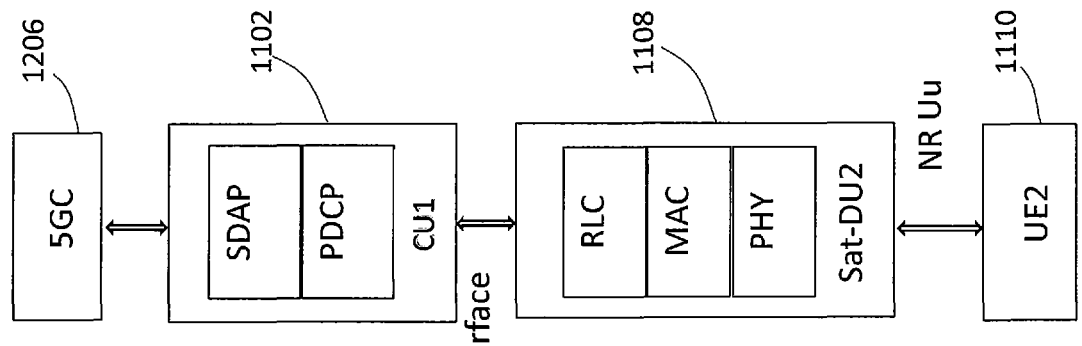
FIGS. 12A and 12B illustrate exemplary communication channels formed as a result of the moving regenerative split-architecture satellites of FIG. 11, in accordance with some embodiments of the present disclosure.
Figure 12A:
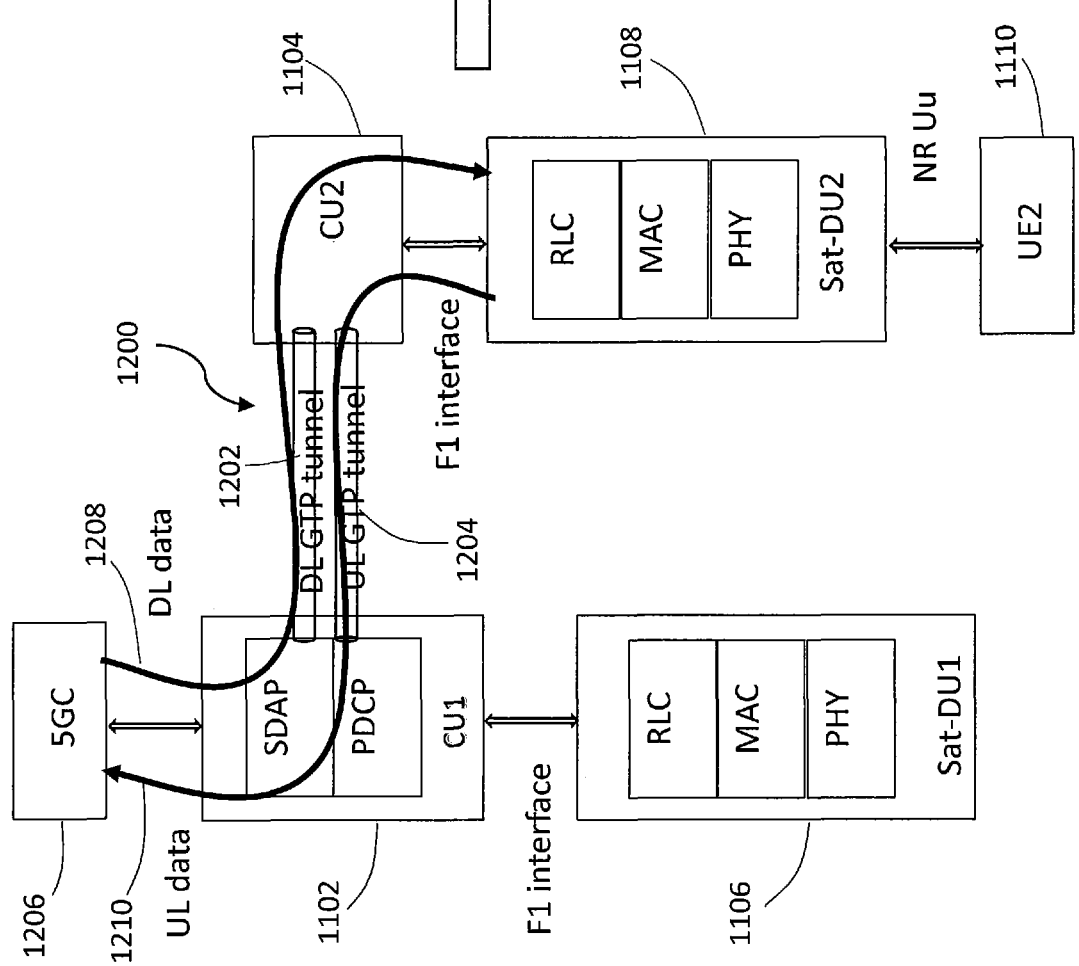

Referring to FIG. 12A, at time T2, since the UE 1110 has switched to the second cell 1116 radiated by the second DU satellite 1108, which is connected to the second CU station 1104, a communications link 1200 is established between the first and second CU stations 1102 and 1104, respectively, so that the first CU station 1102 can remain as the anchor node of the UE 1110. As illustrated in FIG. 12A, in accordance with some embodiments, the communications link 1200 includes at least one DL GTP-U tunnel 1202 and at least one UL GTP-U tunnel 1204 established between first CU station 1102 and the second CU station 1104 for each Radio Bearer (RB) established for the UE 1110. After handover from the first cell 1114 to the second cell 1116, the 5G core network 1206 keeps DL transmissions 1208 and UL data transmissions 1210 for the UE 1110 with the first CU station 1102, avoiding any management processing and data interruptions that would otherwise occur if the anchor node was changed.

During the second time period, after the communications link 1200 is established, upon receiving DL data for the UE 1110 from the 5G core network 1206, the first CU station 1102 performs SDAP and PDCP processing on the DL data and thereafter transmits the DL data to the second CU station 1104 via the established DL GTP-U tunnel(s) 1202. With the reception of the DL data from the first CU station 1102, the second CU station 1104 forwards the DL data to the second DU satellite 1108 without performing SDAP and PDCP processing. As shown in FIG. 12A, upon receiving the DL data from the second CU station 1104 via an F1 interface communications link, the second DU satellite 1108 performs RCL, MAC and PHY layer processing on the DL data and thereafter transmits the data to the UE 1110 via an NR Uu communications link.

When receiving UL data 1210 from the UE 1110, the second DU satellite 1108 performs RLC, MAC and PHY layer processing on the UL data and then forwards the UL data 1210 to the second CU station 1104. The second CU 1104 then forwards the UL data to the first CU 1102 via the established UL GTP-U tunnel 1204 without SDAP and PDCP processing. With the reception of UL data from the second CU station 1104, the first CU station 1102 performs SDAP and PDCP processing and thereafter delivers the UL data to the core network 1206. In some embodiments, during this second time period, the second CU station 1104 functions merely as a data relay for DL and UL data of the UE 1110. Thus, from a functional perspective, during the second time period, the first CU 1102 and the second DU satellite 1108 perform the functions of a CU base station and a DU base station, respectively, in a split architecture network, as discussed above.

In some embodiments, in addition to DL data and UL data, user plane control packets for DRBs of the UE 1110 are also transferred between the first CU station 1102 and the second DU satellite 1108, which are relayed via the second CU station 1104 via the GTP tunnels 1202 and 1204, as discussed above. For example, when receiving a user plane control packet for UE 1110 from second DU satellite 1108, the second CU station 1104 forwards the packet to the first CU station 1102 via the established UL GTP-U tunnel 1204.

In accordance with some embodiments, either the first CU station 1102 or the second CU station 1104 can determine to delete the DL and UL GTP tunnels 1202 and 1204 when the second DU satellite 1108 changes its connection from the second CU station 1104 to the first CU station 1102. As illustrated in FIG. 12B, after the second DU satellite 1108 changes its connection, the DL data from core network 1206 is transmitted from the first CU station 1102 to the second DU satellite 1108 directly over the F1 interface between them. Similarly, the UL data from UE 1110 is transmitted from the second DU satellite 1108 to the first CU station 1102 directly over the F1 interface between them.

Figure 13:
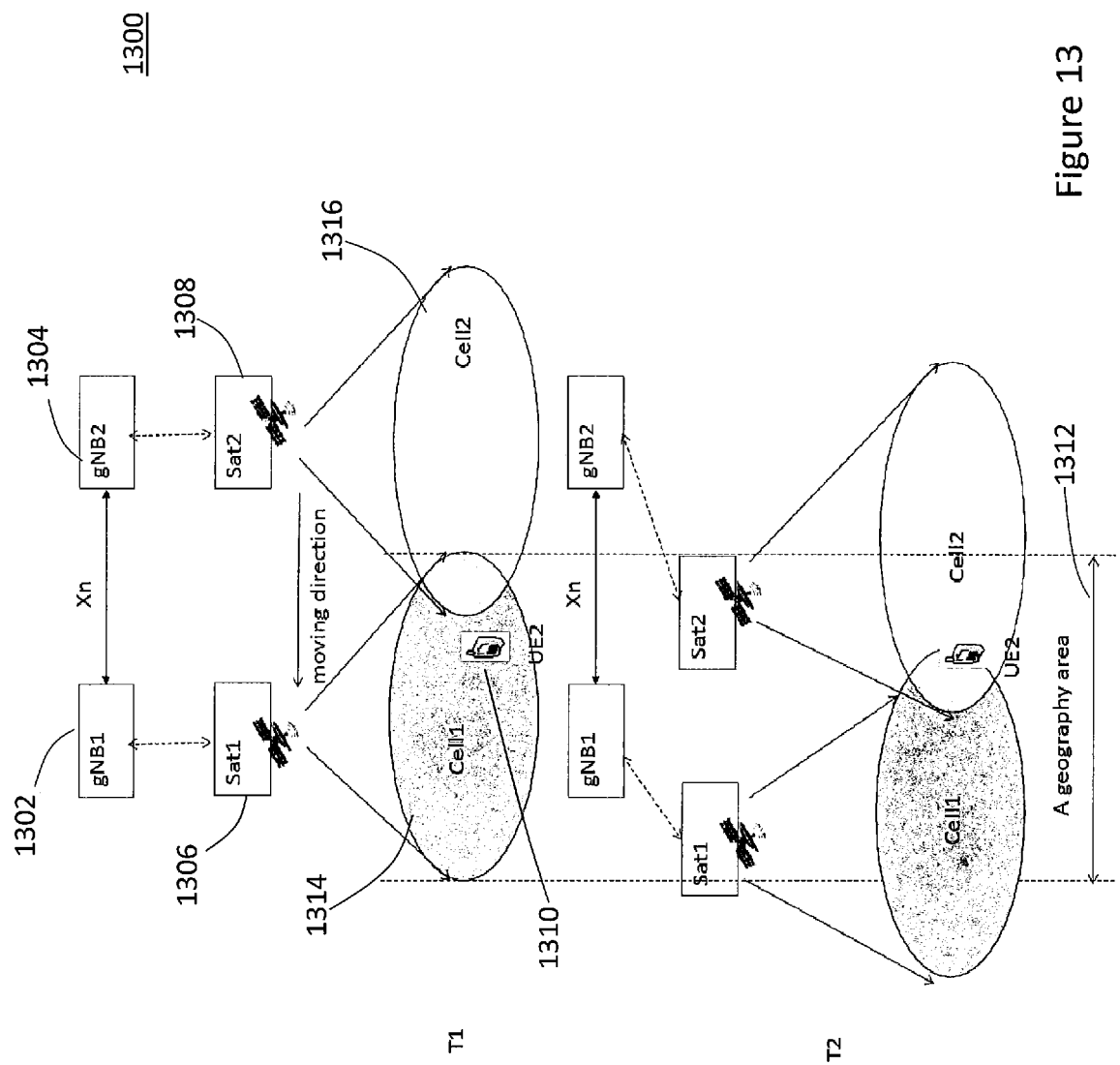
FIG. 13 illustrates an exemplary scenario in which a user equipment device changes geographic cells due to movement of transparent satellites of a non-terrestrial network, in which techniques disclosed herein may be implemented, in accordance with some embodiments of the present disclosure.

The mobility solution discussed above for the scenario of FIG. 11, wherein a NT network employs split architecture CU and DU satellites, can also be applied to a NT network employing transparent satellites connected to terrestrial base stations. FIG. 13 illustrates a scenario wherein a NT network 1300 utilizing terrestrial base stations 1302 and 1304 (gNB1 and gNB2, respectively) and transparent satellites 1306 and 1308 (Sat1 and Sat2, respectively) performs mobility management, in accordance with some embodiments. Compared to the scenario depicted in FIG. 11, the CUS 1102 and 1104 are replaced by the terrestrial base stations 1302 and 1304, respectively, and the DU satellites 1106 and 1108 are replaced with transparent satellites 1306 and 1308, respectively. In some embodiments, the link between a transparent satellite and a terrestrial base station (e.g., a gNB on the earth) is a wireless feeder link over the SRI.

Similar to the scenario described above with respect to FIG. 11, the transparent satellites 1306 and 1308 maintain their connections to the terrestrial base stations 1302 and 1304, respectively, during first and second time periods, however, the UE 1310 (UE2) switches from the first cell 1314 to the second cell 1316 during the second time period at time T2. Similar to the scenario of FIGS. 11 and 12A-12B, after UE handover from the first cell 1314 to the second cell 1316, the first terrestrial base station 1302 determines to keep the PDCP anchor of the UE 1310. Thus, neither the SDAP entity nor the PDCP entity is set up for UE 1310 on the second terrestrial base station 1304.

Figure 14:
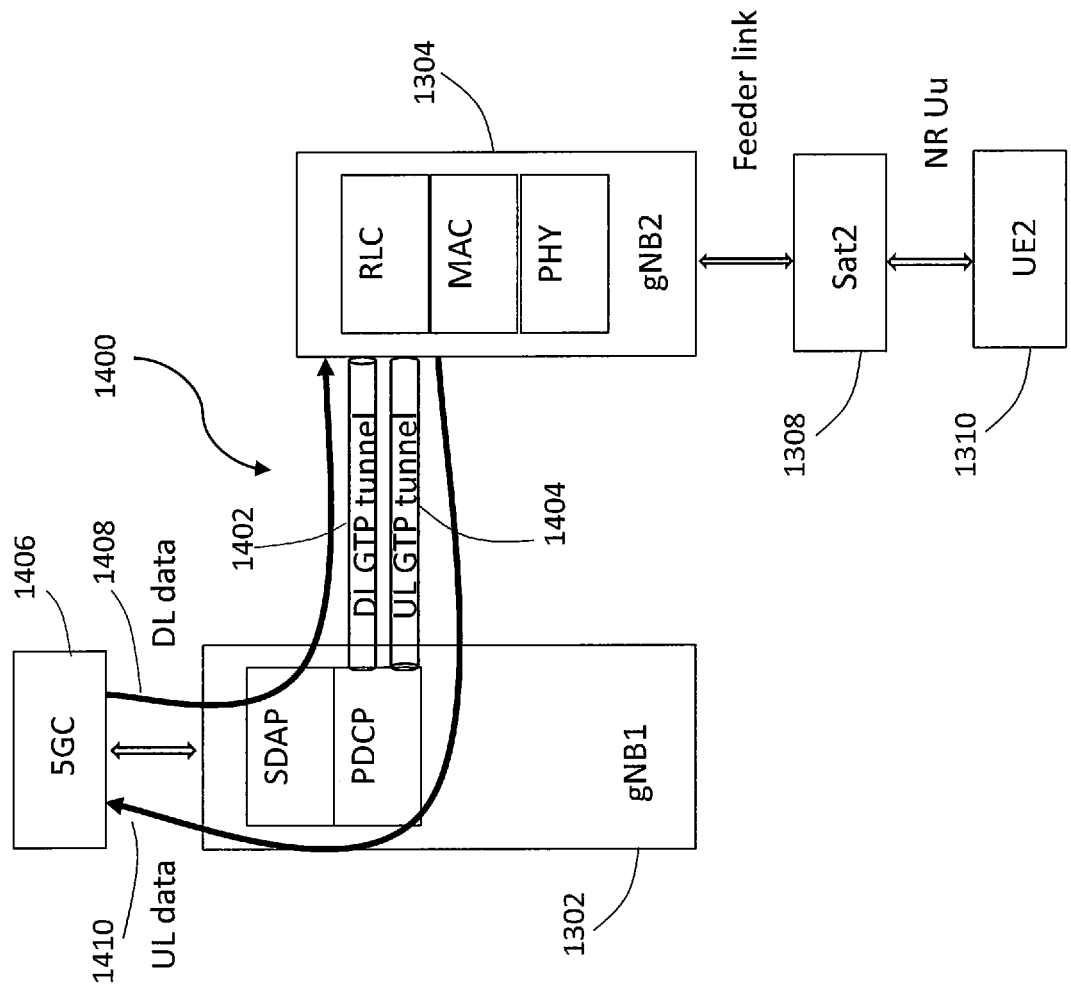
FIG. 14 illustrates exemplary communication channels formed as a result of the moving transparent satellites of FIG. 13, in accordance with some embodiments of the present disclosure.

FIG. 14 illustrates a diagram wherein a communication link 1400 is established between the first base station 1302 and the second base station 1304, during the second time period, after UE 1310 handover from the first cell 1314 to the second cell 1316. The communication link 1310 includes at least one DL GTP-U tunnel 1402 and at least one UL GTP-U tunnel 1404 for each RB established for UE 1310. The DL GTP-U tunnel 1402 and the UL GTP-U tunnel 1404 are similar to the tunnels discussed above with respect to FIG. 12A and enable the first base station 1302 to remain as the anchor node of the UE 1310 during the second time period when the UE is no longer connected to the first transparent satellite 1306.

During the second time period, after the communications link 1400 is established, upon receiving DL data for the UE 1310 from the 5G core network 1406, the first terrestrial base station 1302 performs SDAP and PDCP processing on the DL data and thereafter transmits the DL data to the second terrestrial base station 1304 via the established DL GTP-U tunnel(s) 1402. With the reception of the DL data from the first base station 1302, the second terrestrial base station 1304 performs RLC, MAC and PHY layer processing on the DL data and thereafter forwards the DL data to the second transparent satellite 1308 without performing SDAP and PDCP processing. As shown in FIG. 14, upon receiving the DL data 1408 from the second base station 1304 via a feeder link, the second transparent satellite 1308 transmits the data to the UE 1310 via an NR Uu communications link.

When receiving UL data 1410 from the UE 1310, the second transparent satellite 1308 forwards the UL data to the second base station 1304. The second base station 1304 then performs RLC, MAC and PHY layer processing on the UL data and thereafter forwards the UL data to the first base station 1302 via the established UL GTP-U tunnel 1404 without SDAP and PDCP processing. With the reception of UL data from the second base station 1304, the first base station 1302 performs SDAP and PDCP processing and thereafter delivers the UL data to the core network 1406.

In some embodiments, in addition to DL data and UL data, user plane control packets for DRBs of the UE 1310 are also transferred between the first base station 1302 and the second transparent satellite 1308, which are relayed via the second base station 1304 via the GTP tunnels 1402 and 1404, as discussed above. For example, when receiving a user plane control packet for UE 1310 from second transparent satellite 1308, the second base station 1304 forwards the packet to the first base station 1302 via the established UL GTP-U tunnel 1404.

Figure 15:
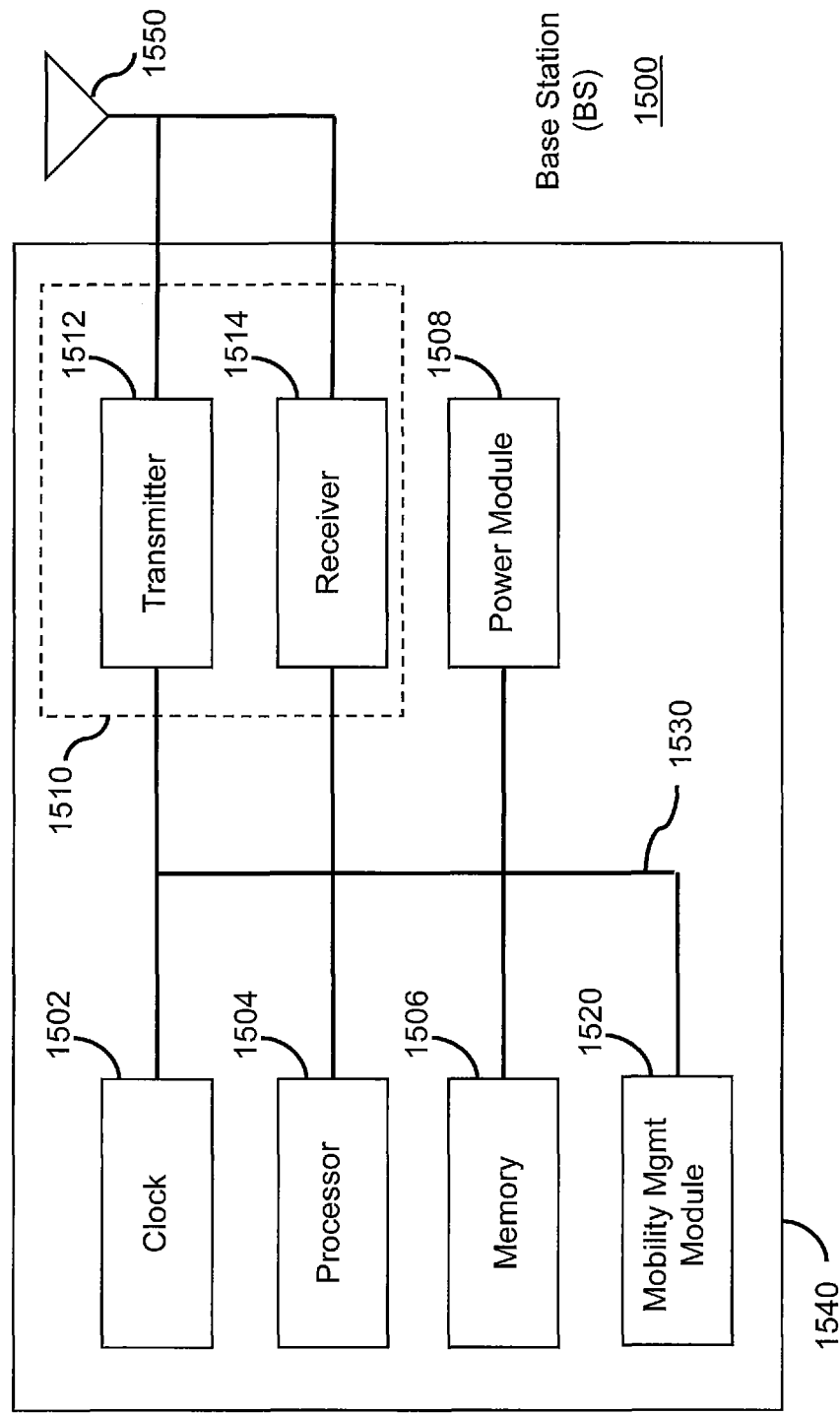
FIG. 15 illustrates a block diagram of a base station (BS), in accordance with some embodiments of the present disclosure.

FIG. 15 illustrates a block diagram of a base station (BS) 1500 that may be utilized as either a terrestrial base station or be implemented in a regenerative satellite to perform the methods disclosed herein, in accordance with various embodiments of the invention. The BS 1500 is an example of a communication node that can be configured to implement the various methods described herein. As shown in FIG. 15, the BS 1500 includes a housing 1540 containing a system clock 1502, a processor 1504, a memory 1506, a transceiver 1510 comprising a transmitter 1512 and receiver 1514, a power module 1508, and a mobility management module 1520.

In this embodiment, the system clock 1502 provides the timing signals to the processor 1504 for controlling the timing of all operations of the BS 1500. The processor 1504 controls the general operation of the BS 1500 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 1506, which can include both read-only memory (ROM) and random access memory (RAM), can provide instructions and data to the processor 1504. A portion of the memory 1506 can also include non-volatile random access memory (NVRAM). The processor 1504 typically performs logical and arithmetic operations based on program instructions stored within the memory 1506. The instructions (a.k.a., software) stored in the memory 1506 can be executed by the processor 1504 to perform the methods described herein. The processor 1504 and memory 1506 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 1510, which includes the transmitter 1512 and receiver 1514, allows the BS 1500 to transmit and receive data to and from a remote device (e.g., a UE). An antenna 1550 is typically attached to the housing 1540 and electrically coupled to the transceiver 1510. In embodiments where the BS 1500 is part of a regenerative satellite, the antenna may be a phase-array antenna or other suitable antenna structure suitable for satellite communications. In various embodiments, the BS 1500 includes (not shown) multiple transmitters, multiple receivers, and multiple transceivers. In some embodiments, the antenna 1550 is replaced with a multi-antenna array that can form a plurality of beams each of which points in a distinct direction.

The mobility management module 1520 may be implemented as part of the processor 1504 programmed to perform the functions herein, or it may be a separate module implemented in hardware, firmware, software or a combination thereof. In accordance with various embodiments, the mobility management module 1520 is configured to perform mobility management functions described herein, such as determining whether to maintain the BS 1500 as an anchor node, performing SDAP, PDCP, RLC, MAC and/or PHY layer processing, establishing communication links with another BS or CU, for example. In some embodiments, the mobility management module 1520 can be implemented as software (i.e., computer executable instructions) stored in a non-transitory computer-readable medium that when executed by processor 1504, transform the processor 1504 into a special-purpose computer to perform the mobility management operations described herein.

The various components and modules discussed above within housing 1540 are coupled together by a bus system 1530. The bus system 1530 can include a data bus and, for example, a power bus, a control signal bus, and/or a status signal bus in addition to the data bus. It is understood that the modules of the BS 1500 can be operatively coupled to one another using any suitable techniques and mediums.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first communication node, the method comprising:
    during a first time period, communicating with a non-terrestrial communication node utilizing a first communication link, wherein the non-terrestrial communication node provides at least one geographic cell in which a user equipment device (UE) is present during the first time period;
    during a second time period,
        communicating with a second communication node utilizing a second communication link,
        establishing a third communication link between the non-terrestrial communication node and the second communication node, and not utilizing the first communication link during the second time period, and wherein the UE remains within the at least one geographic cell during the second time period,
        receiving downlink data from a core network,
        performing service data adaptation protocol (SDAP) processing and packet data convergence protocol (PDCP) processing on the downlink data to provide processed downlink data, and
        transmitting the processed downlink data to the second communication node, wherein the second communication node is configured to forward the processed downlink data to the non-terrestrial communication node without further SDAP and PDCP processing by performing only data relaying between the first communication node and the non-terrestrial communication node; and
    determining to maintain the first communication node as an anchor node for communications between the core network and the UE during both the first and second time periods, wherein security keys associated with the UE remain unchanged during both the first and second time periods.

2. The method of claim 1, further comprising:
during the first time period,
- transmitting the processed downlink data to the non-terrestrial communication node to be forwarded to the UE;
- receiving uplink data from the non-terrestrial communication node, wherein the uplink data is transmitted to the non-terrestrial communication node from the UE;
- performing SDAP and PDCP processing on the uplink data to provide processed uplink data; and
- transmitting the processed uplink data to the core network.

3. The method of claim 1, further comprising:
during the second time period,
- receiving uplink data from the second communication node via the second communication link, wherein the uplink data is transmitted by the UE to the non-terrestrial communication node and thereafter transmitted from the non-terrestrial communication node to the second communication node via the third communication link, and wherein the second communication node does not perform service data adaptation protocol (SDAP) processing and packet data convergence protocol (PDCP) processing on the uplink data before forwarding to the first communication node;
- performing SDAP processing and PDCP processing on the uplink data to provide processed uplink data; and
- transmitting the processed uplink data to the core network.

4. The method of claim 1, further comprising:
during the second time period, receiving a first set of user plane (UP) control packets associated with data resource bearers (DRBs) assigned to the UE from the second communication node, wherein the second set of UP control packets are transmitted from the non-terrestrial communication node to the second communication node for forwarding to the first communication node.

5. The method of claim 4, further comprising:
transmitting a second set of UP control packets associated with the DRBs assigned to the UE to the second communication node for forwarding to the non-terrestrial communication node.

6. The method of claim 1, wherein:
the first communication node comprises a first station on the earth;
the first communication link comprises a first F1 interface over a satellite radio interface (SRI);
the non-terrestrial communication node comprises a satellite;
the second communication node comprises a second station on the earth;
the second communication link comprises at least one downlink general packet radio service (GPRS) tunnel protocol for user plane (DL GTP-U tunnel) and at least one uplink GPRS tunnel protocol for user plane (UL GTP-U tunnel); and
the third communication link comprises a second F1 interface over SRI.

7. The method of claim 6, wherein:
the first station on the earth comprises a first central unit base station configured to perform service data adaptation protocol (SDAP) processing and packet data convergence protocol (PDCP) processing on received data;
the satellite comprises a distributed unit base station configured to perform radio link control (RLC) processing, media access control (MAC) and physical layer (PHY) layer processing on received data; and
the second station on the earth comprises a second central unit base station configured to forward received data to either the first station on the earth or the satellite without performing SDAP and PDCP processing on the received data during the second time period.

8. The method of claim 1, wherein:
the first communication node comprises a first terrestrial base station;
the first communication link comprises a first wireless feeder link over a satellite radio interface (SRI);
the non-terrestrial communication node comprises a transparent satellite;
the second communication node comprises a second terrestrial base station;
the second communication link comprises at least one downlink general packet radio service (GPRS) tunnel protocol for user plane (DL GTP-U tunnel) and at least one uplink GPRS tunnel protocol for user plane (UL GTP-U tunnel); and
the third communication link comprises a second wireless feeder link over SRI.

9. The method of claim 8, wherein:
the first terrestrial base station is configured to perform service data adaptation protocol (SDAP) processing and packet data convergence protocol (PDCP) processing on received downlink or uplink user data prior to transmission to the core network or the second terrestrial base station during the second time period;
the transparent satellite is configured to forward received downlink user data to a UE and forward received uplink user data to the second terrestrial base station during the second time period; and
the second terrestrial base station is configured to perform radio link control (RLC) processing, media access control (MAC) and physical layer (PHY) layer processing on received data and thereafter transmit the processed received data to either the first terrestrial base station or the transparent satellite during the second time period.

10. A method performed by a first communication node, the method comprising:
- during a first time period, communicating with a first non-terrestrial communication node utilizing a first communication link, wherein the first non-terrestrial communication node provides a first geographic cell in which a user equipment device (UE) is present during the first time period;
- during a second time period, communicating with a second communication node utilizing a second communication link during the second time period, the method further comprising, during the second time period:
  - establishing a third communication link between the second communication node and a second non-terrestrial communication node, wherein the UE has moved within a second geographic cell provided by the second non-terrestrial communication node,
  - receiving downlink data from a core network,
  - performing service data adaptation protocol (SDAP) processing and packet data convergence protocol (PDCP) processing on the downlink data to provide processed downlink data, and transmitting the processed downlink data to the second communication node, wherein the second communication node is configured to forward the processed downlink data to the non-terrestrial communication node without further SDAP and PDCP processing by performing only data relaying between the first communication node and the non-terrestrial communication node; and determining to maintain the first communication node as an anchor node for communications between a core network and the UE during both the first and second time periods, wherein security keys associated with the UE remain unchanged during both the first and second time periods.

11. The method of claim 10, further comprising:
during the second time period,
receiving uplink data from the second communication node via the second communication link, wherein the uplink data is transmitted by the UE to the second non-terrestrial communication node and thereafter transmitted from the second non-terrestrial communication node to the second communication node via the third communication link, and wherein the second communication node does not perform SDAP processing and PDCP processing on the uplink data before forwarding to the first communication node;
performing SDAP processing and PDCP processing on the uplink data to provide processed uplink data; and
transmitting the processed uplink data to the core network.

12. The method of claim 10, further comprising:
during the second time period, receiving a first set of user plane (UP) control packets associated with data resource bearers (DRBs) assigned to the UE from the second communication node, wherein the first set of UP control packets are transmitted from the second non-terrestrial communication node to the second communication node for forwarding to the first communication node.

13. The method of claim 12, further comprising:
transmitting a second set of UP control packets associated with the DRBs assigned to the UE to the second communication node for forwarding to the second non-terrestrial communication node.

14. The method of claim 10, wherein:
the first communication node comprises a first station on the earth;
the first communication link comprises a first F1 interface over a satellite radio interface (SRI);
the first non-terrestrial communication node comprises a first satellite;
the second communication node comprises a second station on the earth;
the second communication link comprises at least one downlink general packet radio service tunnel protocol for user plane (DL GTP-U tunnel) and at least one uplink general packet radio service tunnel protocol for user plane (UL GTP-U tunnel);
the second non-terrestrial communication node comprises a second satellite; and
the third communication link comprises a second F1 interface over SRI.

15. The method of claim 14, wherein:
the first station on the earth comprises a first central unit base station configured to perform service data adaptation protocol (SDAP) processing and packet data convergence protocol (PDCP) processing on received data;
the first satellite comprises a first distributed unit base station configured to perform radio link control (RLC) processing, media access control (MAC) and physical layer (PHY) layer processing on received data during the first time period;
the second station on the earth comprises a second central unit base station configured to forward received data to either the first satellite or the second satellite without performing SDAP and PDCP processing on the received data during the second time period; and
the second satellite comprises a second distributed unit base station configured to perform radio link control (RLC) processing, media access control (MAC) and physical layer (PHY) layer processing on received data during the second time period.

16. The method of claim 10, wherein:
the first communication node comprises a first terrestrial base station;
the first communication link comprises a first wireless feeder link over a satellite radio interface (SRI);
the first non-terrestrial communication node comprises a first transparent satellite;
the second communication node comprises a second terrestrial base station;
the second communication link comprises at least one downlink general packet radio service (GPRS) tunnel protocol for user plane (DL GTP-U tunnel) and at least one uplink GPRS tunnel protocol for user plane (UL GTP-U tunnel);
the second non-terrestrial communication node comprises a second transparent satellite; and
the third communication link comprises a second wireless feeder link over SRI.

17. The method of claim 16, wherein:
the first terrestrial base station is configured to perform service data adaptation protocol (SDAP) processing and packet data convergence protocol (PDCP) processing on received downlink or uplink user data prior to transmission to the core network or the second terrestrial base station;
the first transparent satellite is configured to forward received downlink user data to a UE or received uplink user data to the first terrestrial base station during the first time period;
the second transparent satellite is configured to forward received downlink user data to the UE or received uplink user data to the second terrestrial base station during the second time period; and
the second terrestrial base station is configured to perform radio link control (RLC) processing, media access control (MAC) and physical layer (PHY) layer processing on received data and thereafter transmit the processed received data to either the first terrestrial base station or the second transparent satellite during the second time period.

* * * * *